US010091806B2

United States Patent
Aminaka et al.

(10) Patent No.: US 10,091,806 B2
(45) Date of Patent: Oct. 2, 2018

(54) RADIO STATION AND METHOD OF PROCESSING USER DATA WITH RADIO STATION

(71) Applicant: NEC Corporation, Tokyo (JP)

(72) Inventors: Hiroaki Aminaka, Tokyo (JP); Kojiro Hamabe, Tokyo (JE)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/331,404

(22) Filed: Oct. 21, 2016

(65) Prior Publication Data

US 2017/0041943 A1    Feb. 9, 2017

Related U.S. Application Data

(63) Continuation of application No. 14/360,908, filed as application No. PCT/JP2012/006366 on Oct. 3, 2012, now Pat. No. 9,622,260.

(30) Foreign Application Priority Data

Nov. 25, 2011  (JP) ................................ 2011-257477

(51) Int. Cl.
  *H04W 72/12*  (2009.01)
  *H04W 88/08*  (2009.01)
  (Continued)

(52) U.S. Cl.
  CPC ... *H04W 72/1263* (2013.01); *H04W 72/1236* (2013.01); *H04W 72/1252* (2013.01);
  (Continued)

(58) Field of Classification Search
  CPC ........... H04W 72/1263; H04W 88/085; H04W 72/1236; H04W 72/1252; H04W 72/1257;
  (Continued)

(56) References Cited

U.S. PATENT DOCUMENTS 8,050,296 B2   11/2011  Osterling
2003/0189915 A1  10/2003  Miller
(Continued)

FOREIGN PATENT DOCUMENTS

CN   102158461 A   8/2011
EP   1713290 A1   10/2006
(Continued)

OTHER PUBLICATIONS

Japanese Decision to Grant a Patent issued in corresponding Japanese Patent Application No. 2013-545760, dated Nov. 29, 2016, 5 pages.

(Continued)

*Primary Examiner* — Shailendra Kumar

(74) *Attorney, Agent, or Firm* — Wilmer Cutler Pickering Hale and Dorr LLP

(57) ABSTRACT

A radio station (1) includes a first part (1A) and a second part (1B). The second part (1B) can be arranged so as to be physically separated from the first part (1A) and is connected to the first part (1A) via a transmission line (40) so as to be able to communicate with the first part. Each of the first part (1A) and the second part (1B) includes a digital signal processing unit (11A, 11B) and is capable of alternatively performing digital signal processing for user data. An analog signal processing unit (13) arranged in the second part performs analog signal processing including at least one of frequency conversion and power amplification to provide an air interface to a mobile station.

5 Claims, 19 Drawing Sheets

(51) Int. Cl.
*H04L 1/18* (2006.01)
*H04L 27/26* (2006.01)
*H04L 29/06* (2006.01)

(52) U.S. Cl.
CPC ..... *H04W 72/1257* (2013.01); *H04W 88/085* (2013.01); *H04L 1/18* (2013.01); *H04L 1/1812* (2013.01); *H04L 27/2628* (2013.01); *H04L 69/22* (2013.01); *H04W 72/12* (2013.01)

(58) Field of Classification Search
CPC .......... H04W 72/12; H04L 69/22; H04L 1/18; H04L 1/1812; H04L 27/2628
See application file for complete search history.

(56) References Cited

U.S. PATENT DOCUMENTS

| | | | |
|---|---|---|---|
| 2004/0147236 | A1 | 7/2004 | Parkvall et al. |
| 2004/0228349 | A1 | 11/2004 | Vrzic et al. |
| 2005/0047335 | A1 | 3/2005 | Cheng et al. |
| 2005/0096054 | A1 | 5/2005 | Zhang et al. |
| 2005/0141477 | A1 | 6/2005 | Tomita et al. |
| 2005/0255823 | A1 | 11/2005 | Zhang et al. |
| 2006/0142021 | A1 | 6/2006 | Mueckenheim et al. |
| 2006/0251030 | A1 | 11/2006 | Anderson et al. |
| 2007/0073895 | A1 | 3/2007 | Sebire et al. |
| 2007/0184840 | A1 | 8/2007 | Zhang et al. |
| 2008/0101257 | A1 | 5/2008 | Cheng et al. |
| 2008/0186944 | A1 | 8/2008 | Suzuki et al. |
| 2010/0075678 | A1 | 3/2010 | Akman et al. |
| 2010/0195544 | A1 | 8/2010 | Anderson et al. |
| 2010/0329373 | A1* | 12/2010 | Kameya .............. H04L 27/2678 375/260 |
| 2011/0065396 | A1 | 3/2011 | Hirata |
| 2011/0128950 | A1 | 6/2011 | Tomita et al. |
| 2011/0158332 | A1 | 6/2011 | Wu et al. |
| 2011/0171944 | A1 | 7/2011 | Kobayashi et al. |
| 2011/0235564 | A1* | 9/2011 | Watanabe .......... H04W 72/005 370/312 |
| 2011/0274044 | A1* | 11/2011 | Park ........................ H04L 47/10 370/328 |
| 2012/0057548 | A1 | 3/2012 | Hasegawa |
| 2013/0017852 | A1* | 1/2013 | Liu ..................... H04W 88/085 455/509 |
| 2013/0272213 | A1 | 10/2013 | Manssour |
| 2013/0329698 | A1 | 12/2013 | Miller |

FOREIGN PATENT DOCUMENTS

| | | |
|---|---|---|
| EP | 2299758 A2 | 3/2011 |
| EP | 1545143 B1 | 6/2011 |
| EP | 2328382 A1 | 6/2011 |
| EP | 2373069 A2 | 10/2011 |
| EP | 2525623 A2 | 11/2012 |
| EP | 2672743 A1 | 12/2013 |
| JP | 2005-057651 A | 3/2005 |
| JP | 2006-191592 A | 7/2006 |
| JP | 2007-503173 A | 2/2007 |
| JP | 2007-511136 A | 4/2007 |
| JP | 2008-099306 A | 4/2008 |
| JP | 2008-177969 A | 7/2008 |
| JP | 2008-541523 A | 11/2008 |
| JP | 2009-510874 A | 2/2009 |
| JP | 2010-74755 A | 4/2010 |
| JP | 2011-066593 A | 3/2011 |
| JP | 2011-515895 A | 5/2011 |
| JP | 2011-114689 A | 6/2011 |
| JP | 2011-142516 A | 7/2011 |
| JP | 2011-193072 A | 9/2011 |
| JP | 2011-211325 A | 10/2011 |
| WO | WO-2004/030396 A1 | 4/2004 |
| WO | WO-2004/095861 A1 | 11/2004 |
| WO | WO-2010/038287 A1 | 4/2010 |
| WO | WO-2011/004645 A1 | 1/2011 |
| WO | WO-2011/111106 A1 | 9/2011 |
| WO | WO-2011/114429 A1 | 9/2011 |
| WO | WO-2011/127855 A2 | 10/2011 |
| WO | WO-2013/076900 A1 | 5/2013 |

OTHER PUBLICATIONS

Japanese Notification of Reasons for Refusal issued in corresponding Japanese Patent Application No. 2013-545758, dated Dec. 6, 2016, 14 pages.
Japanese Notification of Reasons for Refusal issued in corresponding Japanese Patent Application No. 2013-545759, dated Nov. 29, 2016, 10 pages.
Japanese Notification of Reasons for Refusal issued in corresponding Japanese Patent Application No. 2013-545761, dated Nov. 29, 2016, 9 pages.
MediaTek, Inc. "Simulation Evaluation for CoMP Scenarios 3 and 4", 3GPP TSG-RAN WG1 #65, R1-111528, Barcelona, Spain, May 9-13, 2011, 6 pages.
Qualcomm Incorporated "Leveraging the Existing X2 interface in HetNet CoMP Deployments", 3GPP TSG-RAN #66, R1-112548, Aug. 22-26, 2011, Athens, Greece, 3 pages.
Qualcomm Incorporated "Phase 2 Evaluation Results for HetNet CoMP Scenarios", 3GPP TSG-RAN WG1 #66, R1-112544, Aug. 22-26, 2011, Athens, Greece, 9 pages.
Chttl, Htc et al., "Views on heterogeneous deployment scenarios with distributed RRHs," 3GPP TSG RAN WG1 Meeting #64, R1-111006, Taipei, Taiwan, 3 pages (Feb. 21-25, 2011).
Common Public Radio Interface (CPRI) Specification V4.2 (Sep. 29, 2010), [online], Sep. 2010, Ericsson AB, Huawei Technologies Co. Ltd, NEC Corporation, Alcatel Lucent and Nokia Siemens Networks GmbH & Co. KG, [retrieved on Oct. 20, 2011], Internet <URL:http://www.cpri.info/spec.html> ( pp. 1-113).
Common Public Radio Interface (CPRI) Specification V5.0 (Sep. 21, 2011), Ericsson AB, Huawei Technologies Co. Ltd, NEC Corporation, Alcatel Lucent and Nokia Siemens Networks GmbH & Co. KG, pp. 1-119 (Sep. 21, 2011).
Extended European Search Report issued by the European Patent Office corresponding to European Application No. 12851052.6 dated Jul. 23, 2015, 6 pages.
Extended European Search Report issued by the European Patent Office corresponding to European Application No. 12851142.5 dated Aug. 12, 2015, 7 pages.
Extended European Search Report issued by the European Patent Office for Application No. 12851877.6 dated Sep. 28, 2015 (7 pages).
International Search Report corresponding to International Application No. PCT/JP2012/006346, dated Jan. 15, 2013, 7 pages.
International Search Report corresponding to International Application No. PCT/JP2012/006365, dated Dec. 18, 2012, 2 pages.
International Search Report corresponding to International Application No. PCT/JP2012/006366, dated Dec. 18, 2012, 2 pages.
International Search Report corresponding to International Application No. PCT/JP2012/006367, Dec. 18, 2012, 2 pages.
Japanese Office Action issued by the Japan Patent Office for Japanese Application No. 2016-245451 dated Nov. 14, 2017 (7 pages).
U.S. Office Action issued by the U.S. Patent and Trademark Office for U.S. Appl. No. 15/257,702 dated Nov. 6, 2017 (38 pages).
Japanese Office Action issued by the Japan Patent Office for Japanese Application No. 2017-097064 dated May 8, 2018 (6 pages).
Japanese Office Action issued by the Japan Patent Office for Japanese Application No. 2017-097065 dated May 15, 2018 (6 pages).
3GPP TS 25.301 V3.8.0 (Jun. 2001) Technical Specification, 3rd Generation Partnership Project; Technical Specification Group Radio Access Network; Radio Interface Protocol Architecture (Release 1999) 39 pages (Jun. 2001).
3GPP TS 25.322 V6.12.0 (May 2008) Technical Specification, 3rd Generation Partnership Project; Technical Specification Group Radio

(56) References Cited

OTHER PUBLICATIONS

Access Network; Radio Link Control (RLC) protocol specification (Release 6), 86 pages (May 2008).
U.S. Office Action issued by the U.S. Patent and Trademark Office for the U.S. Appl. No. 15/358,674 dated Jul. 2, 2018 (15 pages).

* cited by examiner

RADIO STATION AND METHOD OF PROCESSING USER DATA WITH RADIO STATION

CROSS-REFERENCE TO RELATED APPLICATIONS

This application is a continuation patent application of U.S. patent application Ser. No. 14/360,908 entitled "Radio Station And Method Of Processing User Data With Radio Station," filed on May 27, 2014, which is a national stage application of International Application No. PCT/JP2012/006366 entitled "Wireless Station and Method of Processing User Data with Wireless Station," filed on Oct. 3, 2012, which claims the benefit of the priority of Japanese Patent Application No. 2011-257477, filed on Nov. 25, 2011, the disclosures of each of which are hereby incorporated by reference in their entirety.

TECHNICAL FIELD

The present invention relates to a configuration of a radio station (e.g., a radio base station, a relay station) used in a radio communication network.

BACKGROUND ART

A structure of a radio base station including a radio equipment controller (REC) and a radio equipment (RE), which are separated from each other, is disclosed in Patent Literature 1 and Non-Patent Literature 1. The REC and the RE are at least functionally separated from each other. The REC and the RE are connected to each other through an internal interface (communication interface) of the radio base station. The REC and the RE may be arranged so as to be physically spaced apart from each other. In a typical layout, the REC is arranged in a main building of a telecom carrier and the RE is arranged at a remote location near an antenna.

The REC is connected to an upper network (e.g., a core network of a telecom carrier). The REC plays a role in controlling and monitoring the entire radio base station and performing digital baseband signal processing. In this case, the digital baseband signal processing includes layer-2 signal processing and layer-1 (physical layer) signal processing. The layer-2 signal processing includes at least one of (i) data compression/de-compression, (ii) data encryption, (iii) addition/removal of a layer-2 header, (iv) data segmentation/concatenation, and (v) composition/decomposition of a transfer format by data multiplexing/de-multiplexing. In the case of E-UTRA, as a specific example, the layer-2 signal processing includes processing of Radio Link Control (RLC) and Media Access Control (MAC). The physical layer signal processing includes channel coding/decoding, modulation/demodulation, spreading/de-spreading, resource mapping, and generation of OFDM symbol data (baseband OFDM signal) by Inverse Fast Fourier Transform (IFFT).

The RE plays a role in performing analog radio frequency (RF) signal processing, and provides an air interface to a mobile station. The analog radio frequency (RF) signal processing includes D/A conversion, A/D conversion, frequency up-conversion, frequency down-conversion, and amplification. The RE is also referred to as a remote radio head (RRH).

For example, in the case of a radio access network of a universal mobile telecommunications system (UMTS), the REC provides a connection to a radio network controller (RNC) using an Iub interface for sending and receiving user data (user plane data) and control data (control plane data). On the other hand, the RE provides a mobile station with an air interface called a Uu interface.

In the case of Evolved Universal Terrestrial Radio Access (E-UTRA), the REC provides a connection to an evolved packet core (EPC) using an S1 interface for sending and receiving user data and control data. On the other hand, the RE provides a mobile station with an air interface called an LTE-Uu interface.

As described above, the separated structure of the radio base station disclosed in Patent Literature 1 and Non-Patent Literature 1 is characterized in that a part that performs analog RF signal processing is separated as the RE. This separated structure makes it possible to flexibly and effectively deal with an increase and a change in the functions implemented in the radio base station. In addition, this separated structure makes it possible to easily deal with independent advancement of an analog RF technique and a digital baseband technique by separating the two techniques.

CITATION LIST

Patent Literature

Patent literature 1: International Patent Publication No. WO 2004/095861

Non-Patent Literature

Non-Patent literature 1: Common Public Radio Interface (CPRI) Specification V4.2 (2010-09-29), [online], September, 2010, Ericsson AB, Huawei Technologies Co. Ltd, NEC Corporation, Alcatel Lucent and Nokia Siemens Networks GmbH & Co. KG, [retrieved on Oct. 20, 2011], Internet <URL:http://www.cpri.info/spec.html>

SUMMARY OF INVENTION

Technical Problem

It is predicted that as the traffic (user data) to be processed by the radio base station increases, the traffic between the REC and the RE also increases. However, in the separated structure disclosed in Patent Literature 1 and Non-Patent Literature 1, the REC performs digital signal processing (channel coding, modulation, spreading, generation of an OFDM signal, etc.) on the physical layer. The channel coding, spreading, and the like increase the redundancy of transmitted data. Accordingly, the data amount of a transmitted data stream obtained by performing the digital signal processing on the physical layer is generally larger than that of a data stream before performing the digital signal processing. For this reason, in the separated structure disclosed in Patent Literature 1 and Non-Patent Literature 1, traffic congestion in a communication line between the REC and the RE may occur due to an increase in traffic in the future. To deal with this, the present inventors have studied a modification so as to perform the baseband signal processing at the RE instead of at the REC. This suppresses the traffic congestion in the communication line between the REC and the RE. Further, when a plurality of REs are connected to one REC, the baseband signal processing is performed in a distributed manner between the REs, thereby making it possible to reduce the processing load of the REC.

However, the modification so as to perform the baseband signal processing at the REs instead of at the REC causes another problem. Specifically, when the baseband signal processing is performed at respective REs, it is difficult to perform cooperative control among these REs. A specific example of the cooperative control among the REs is cooperative transmission and reception (e.g., Inter-Cell Interference Coordination (ICIC), Coordinated multipoint transmission/reception (CoMP)) between one mobile station and a plurality of cells (or sectors) of the plurality of REs. The CoMP is to be adopted as an LTE-Advanced technique that is being standardized by the 3rd Generation Partnership Project (3GPP). The CoMP is intended to, for example, increase the communication speed of mobile stations located at a cell edge, and improve the cell throughput. In the CoMP, cells or sectors cooperate with each other to transmit and receive signals to and from one mobile station. This leads to an improvement of the Signal to Noise Ratio (SNR) and suppression of the inter-cell interference. To carry out the CoMP, it is desirable to perform a radio resource control for a plurality of cells (or sectors) in a centralized manner. The centralized radio resource control can be achieved relatively easily by performing the baseband signal processing for the plurality of REs and control of the baseband signal processing at one REC in a centralized manner.

As described above, for example, the need for reducing the traffic between the REC and the RE and the need for achieving the cooperative control among the plurality of REs are conflicting needs in terms of the allocation of the baseband signal processing. In other words, when the baseband signal processing is performed at the REC or at the RE in a fixed manner, one of the above-mentioned needs can be met, but it is difficult to meet the other need. Additionally, other needs, such as the need for suppressing power consumption in the REC, conflict with the need to achieve the cooperative control. Accordingly, it is desirable to appropriately select one of the REC and the RE to perform at least a part of the baseband signal processing, depending on the need to be preferentially met.

The present invention has been made based on the above-mentioned study by the present inventors. Therefore, it is an object of the present invention to provide a radio station having a separated structure and a method of processing user data capable of selecting which one of the REC and the RE is used to perform at least a part of baseband signal processing for user data.

Solution to Problem

A first aspect of the present invention includes a radio station that is used in a radio communication network and is capable of transmitting and receiving user data including downlink user data and uplink user data to and from a plurality of mobile stations via an air interface. The radio station includes a first part and at least one second part that can be arranged so as to be physically separated from the first part and is connected to the first part via a transmission line so as to be able to communicate with the first part.

The first part includes a first scheduling unit and a first signal processing unit. The first scheduling unit is configured to perform dynamic scheduling to allocate a plurality of radio resources to the plurality of mobile stations or the user data. The first signal processing unit is configured to be capable of performing digital signal processing in order to transmit the downlink user data to the air interface and to restore the uplink user data from a signal received from the air interface.

The second part includes a second signal processing unit and an analog signal processing unit. The second signal processing unit is configured to be capable of performing, instead of the first processing unit, digital signal processing for a first mobile station connected to the second part. The analog signal processing unit performs analog signal processing including at least one of frequency conversion and power amplification to provide the air interface to the first mobile station.

A second aspect of the present invention includes a method of processing user data performed by a radio station. The radio station is used in a radio communication network, and is configured to transmit and receive user data including downlink user data and uplink user data to and from a plurality of mobile stations via an air interface. The radio station includes a first part and at least one second part that can be arranged so as to be physically separated from the first part and is connected to the first part via a transmission line so as to be able to communicate with the first part.

The first part includes a first signal processing unit capable of performing digital signal processing in order to transmit the downlink user data to the air interface and to restore the uplink user data from a signal received from the air interface. The second part includes a second signal processing unit capable of performing, instead of the first signal processing unit, digital signal processing for a first mobile station connected to the second part.

The processing method according to the second aspect includes alternatively using one of the first and second signal processing units for the digital signal processing for the first mobile station.

Advantageous Effects of Invention

According to the above-mentioned aspects of the present invention, it is possible to provide a radio station having a separated structure and a method of processing user data capable of selecting which one of the REC and the RE is used to perform at least a part of baseband signal processing for user data.

DESCRIPTION OF EMBODIMENTS

Figure 1:
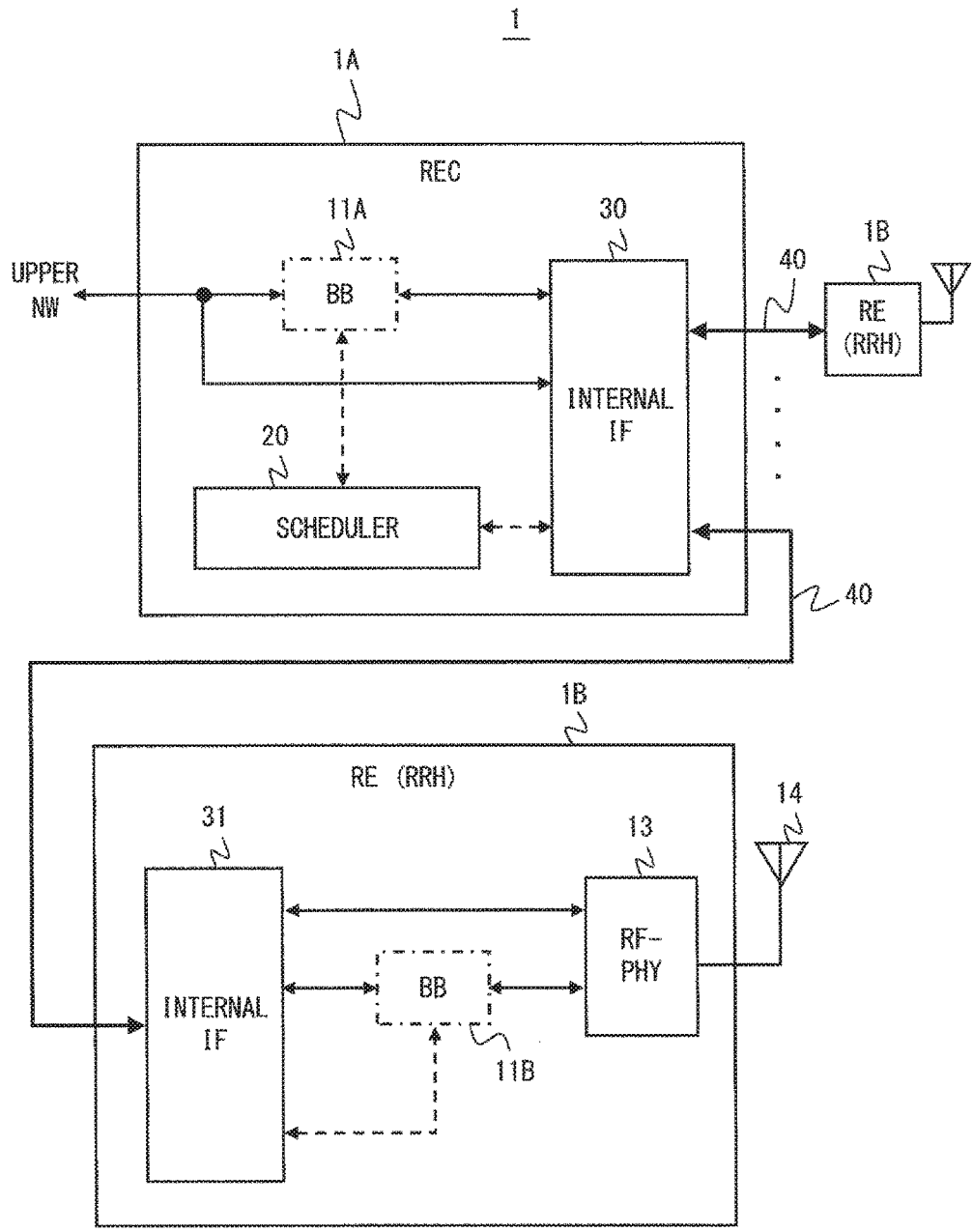
FIG. 1 is a block diagram showing a configuration example of a radio base station according to a first embodiment of the invention.

Specific embodiments of the present invention will be described in detail below with reference to the drawings. The same or corresponding components are denoted by the same reference numerals throughout the drawings, and a repeated description thereof is omitted as needed to clarify the explanation. In the following description, E-UTRA/LTE (Long Term Evolution) radio base stations will be mainly described. However, such a specific radio communication system is described not to limit the scope of the present invention, but to facilitate understanding of the present invention. In other words, those skilled in the art can apply the principle and idea grasped from the embodiments described in detail below to various radio communication systems.

First Embodiment

FIG. 1 is a block diagram showing a configuration of a radio base station 1 according to this embodiment. The radio base station 1 is used in a radio communication network and is capable of transmitting and receiving user data including downlink user data and uplink user data to and from a plurality of mobile stations via an air interface. The radio base station 1 includes a first part, i.e., a radio equipment controller (REC) 1A, and at least one second part, i.e., a radio equipment (RE) 1B. The RE 1B can be arranged so as to be physically separated from the REC 1A via a transmission line 40, and is connected to the REC 1A via the transmission line 40 so as to be able to communicate with the REC 1A. The transmission line 40 may be an electrical transmission line or an optical transmission line. Alternatively, the transmission line 40 may be a point-to-point type radio transmission line (e.g., a microwave radio transmission line). The transmission line 40 may include a plurality of physical transmission lines for bidirectional transmission. As shown in FIG. 1, a plurality of REs 1B may be connected to the REC 1A.

Internal interfaces 30 and 31, which are arranged in the REC 1A and the RE 1B, respectively, have layer-2 and layer-1 functions for bidirectional communication via the transmission line 40. Each of the internal interfaces 30 and 31 may be an electrical interface, an optical interface, or a radio interface. For example, an existing transceiver, such as 1000BASE-CX, 1000BASE-SX, 1000BASE-LX, 10GBASE-LX4, or a fibre channel, may be used as the internal interfaces 30 and 31.

The REC 1A includes a scheduler 20. The scheduler 20 performs dynamic scheduling for the downlink and uplink. In other words, the scheduler 20 dynamically allocates a plurality of downlink and uplink radio resources to a plurality of mobile stations or user data. The radio resources are distinguished by time, frequency, or spreading code, or a combination thereof. For example, in the case of E-UTRA, dynamic scheduling is performed assuming that each radio resource is a resource block and two resource blocks within one sub-frame (1 msec) are defined as a minimum unit. One resource block includes 12 subcarriers in a frequency domain, and includes seven OFDM symbols in a time domain.

The dynamic scheduling for the downlink is achieved by selecting data to be allocated to each radio resource from a buffer (not shown), by using a scheduling technique such as Proportional Fairness (PF), max-C/I (carrier/interference), or round robin. The buffer temporarily stores the downlink user data which has arrived from an upper network. The buffer may store encrypted bearer data (e.g., Si bearer data) transferred between the upper network and the base station 1. Alternatively, the buffer may store data (e.g., PDCP Protocol Data Units (PDUs), RLC PDUs) obtained by performing the layer-2 processing, such as data compression (e.g., IP header compression) and segmentation/concatenation, on the downlink user data. The buffer is prepared, for example, for each mobile station, for each bearer, for each QoS class, or for each mobile station and each QoS class. The unit in which the buffer is prepared is determined as appropriate depending on the layout of the buffer, requirements for scheduling (e.g., the presence or absence of a QoS class, the necessity to secure a transmission rate), or the like.

The dynamic scheduling for the uplink is performed based on, for example, the reception of a resource allocation request from a mobile station, or a monitoring result of a data buffer arranged in the mobile station. The dynamic scheduling for the uplink is achieved by determining mobile stations to be allocated to radio resources, by using a scheduling technique such as PF, max-C/I, or round robin.

Further, in the case of E-UTRA, as a specific example, the dynamic scheduling performed by the scheduler 20 includes selection of a payload in a radio link control (RLC) sublayer, control of re-transmission in a MAC sublayer, and designation of a coding rate, a modulation scheme and a radio resource in a physical layer. Control information relating to the dynamic scheduling are sent to a BB unit 11A or 11B by signaling as indicated by dashed lines in FIG. 1.

The REC 1A further includes the BB unit 11A. The BB unit 11A performs digital baseband signal processing. In other words, the BB unit 11A performs digital signal processing for transmitting the downlink user data to the air interface and for restoring the uplink user data from the signal received from the air interface. The digital baseband signal processing performed by the BB unit 11A includes, for example, layer-2 signal processing and layer-1 (physical layer) signal processing. The layer-2 signal processing includes at least one of (i) data compression/de-compression, (ii) data encryption, (iii) addition/removal of a layer-2 header, (iv) data segmentation/concatenation, and (v) composition/decomposition of a transfer format by data multiplexing/de-multiplexing. The physical layer signal processing includes channel coding/decoding and modulation/demodulation.

In the case of E-UTRA, as a specific example, the layer-2 signal processing includes processing of the RLC sublayer and the MAC sublayer. The RLC sublayer utilizes a bearer termination unit 10 as an upper protocol layer. The MAC sublayer utilizes the RLC sublayer as an upper protocol layer, and utilizes the baseband signal processing on the physical layer (BB-PHY) as a lower protocol layer. The E-UTRA further includes a PDCP sublayer as an upper sublayer of the RLC sublayer. However, processing (e.g., IP header compression, encryption) in the PDCP sublayer is not essential and may be omitted.

In the case of E-UTRA, the PDCP sublayer plays a role in performing processing for reducing the data amount to be transmitted in a manner suitable for the transmission and reception via the air interface. Specifically, the PDCP sublayer performs IP header compression for the downlink user data, and IP header de-compression for the uplink user data. The PDCP sublayer also performs encryption of the user data, and duplication and transfer of the user data so as to reduce a delay in handover.

The RLC sublayer of the E-UTRA performs segmentation and concatenation and re-transmission control for radio bearer data (PDCP Protocol Data Units (PDUs)) supplied from the PDCP sublayer. The RLC sublayer provides, to the PDCP sublayer, a data transfer service using a radio bearer. The RLC sublayer is connected to the MAC sublayer through a logical channel (RLC PDUs).

The MAC sublayer of the E-UTRA performs multiplexing of the logical channels (RLC PDUs), and hybrid-ARQ (automatic repeat request) re-transmission. The MAC sublayer generates a transport channel by multiplexing the logical channels (RLC PDUs). The transmission format (data block size) of the transport channel depends on an instantaneous data rate. The MAC sublayer is connected to the physical layer through the transport channel (MAC PDUs).

In the case of E-UTRA, the physical layer signal processing includes not only channel coding/decoding and modulation/demodulation, but also resource mapping and generation of OFDM symbol data (baseband OFDM signal) by Inverse Fast Fourier Transform (IFFT), for example.

Next, the RE 1B will be described. The RE 1B includes the BB unit 11B and an RF-PHY unit 13. The BB unit 11B is configured to be capable of performing partial processing, for a mobile station connected to the RE 1B, of the digital baseband signal processing that can be performed by the BB unit 11A of the REC 1A, instead of the BB unit 11A, i.e., alternatively therewith.

The RF-PHY unit 13 is connected to an antenna 14, and performs analog RF signal processing on the physical layer to provide an air interface to each mobile station connected to the RE 1B. The signal processing performed by the RF-PHY unit 13 includes at least one of D/A conversion, A/D conversion, frequency up-conversion, frequency down-conversion, and amplification. The RF-PHY unit 13 is selectively coupled to the BB unit 11A or 11B. Specifically, the RF-PHY unit 13 receives modulation symbol data (or OFDM symbol data) from the BB unit 11A or 11B, generates a downlink RF signal, and transmits the downlink RF signal via the antenna 14. The RF-PHY unit 13 receives an uplink RF signal from the antenna 14, generates a baseband reception signal stream, and supplies the baseband reception signal stream to the BB unit 11A or 11B.

The radio base station 1 alternatively uses one of the BB units 11A and 11B for digital baseband signal processing for the user data pertaining to a mobile station connected to the RE 1B. The selection of one of the BB units 11A and 11B to be used may be collectively performed for all user data pertaining to all mobile stations connected to the radio base station 1. Alternatively, the selection may be individually performed for each mobile station, for each user data, or for each bearer (e.g., an S1 bearer) encrypted between the upper network and the radio base station 1. When a plurality of REs 1B are connected to the base station 1, the selection of one of the BB units 11A and 11B to be used may be individually performed for each RE 1B.

The selection of one of the BB units 11A and 11B to be used may be performed through manual setting of the radio base station 1 by an operator. Alternatively, the selection may be autonomously performed by a controller (not shown), which is arranged in the REC 1A or the RE 11B, by determining the establishment of a selection condition. In one more alternative, the selection may be performed based on an instruction from an external device, such as a resource control apparatus or an OAM (Operation Administration and Maintenance) system, which are arranged outside of the radio base station 1.

Next, conditions for selecting one of the BB units 11A and 11B will be described. The selection of one of the BB units 11A and 11B to be used can be performed based on various selection conditions. A selection condition to be used may be determined as appropriate depending on the needs to be preferentially met, such as the achievement of the cooperative control among the plurality of REs, the reduction in the processing load of the REC, or the reduction in the traffic between the REC and the RE. Specific examples of selection conditions for the BB units 11A and 11B are given below.

Specific Example 1

The selection of one of the BB units 11A and 11B to be used is performed based on the amount of traffic to be processed by the entire radio base station 1, the REC 1A, or the RE 1B. For example, when the amount of traffic to be processed by the RE 1B exceeds a predetermined level, the BB unit 11A of the REC 1A may be selected. By preferentially using the BB unit 11A of the REC 1A, the cooperative transmission and reception (e.g., CoMP) between one mobile station and a plurality of cells (or sectors) of a plurality of REs 1B can be performed relatively easily, and the cell throughput can be increased. On the other hand, when the amount of traffic to be processed by the RE 1B is less than the predetermined level, the BB unit 11B of the RE 1B may be selected. As a result, a redundancy due to channel coding can be avoided and the amount of traffic between the REC and the RE can be reduced. A reduction in power consumption of the REC 1A can also be expected.

Specific Example 2

The selection of one of the BB units 11A and 11B to be used is performed based on the necessity to perform a cooperative control among a plurality of REs 1B connected to the REC 1A. For example, when it is necessary to preferentially perform the cooperative control among the plurality of REs 1B, the BB unit 11A of the REC 1A may be selected. This makes it possible to relatively easily perform the cooperative transmission and reception (e.g., CoMP). On the other hand, when there is no need to perform the cooperative control among the plurality of REs 1B, or when a higher priority is placed on another condition (e.g., a reduction in power consumption of the REC 1A, or a reduction in traffic between the REC and the RE), the BB unit 11B of the RE 1B may be selected. This makes it possible to meet another need, such as a reduction in power consumption of the REC 1A, when there is no need for the cooperative transmission and reception.

Specific Example 3

The selection of one of the BB units 11A and 11B to be used is performed based on the power consumption of the entire radio base station 1, the REC 1A, or the RE 1B. For example, when the power consumption of the REC 1A exceeds a predetermined level, the BB unit 11B of the RE 1B may be selected. This makes it possible to reduce the power consumption of the REC 1A. Further, for example, when the power consumption of the RE 1B exceeds the predetermined level, the BB unit 11A of the REC 1A may be selected. This makes it possible to reduce the power consumption of the RE 1B.

Specific Example 4

The selection of one of the BB units 11A and 11B to be used is performed based on the load status of the REC 1A or the RE 1B. For example, when the load of the REC 1A exceeds a predetermined level, the BB unit 11B of the RE 1B may be selected. This makes it possible to achieve a distribution of the load between the REC 1A and the RE 1B and suppress an increase in the load of the REC 1A. Further, for example, when the load of the RE 1B exceeds the predetermined level, the BB unit 11A of the REC 1A may be selected. This makes it possible to suppress an increase in the load of the RE 1B. More specifically, a resource use rate of each RE 1B (each cell) is measured periodically, and when the resource use rate exceeds the predetermined level, the BB unit 11A of the REC 1A may be selected. Alternatively, in the case of setting a new bearer, the resource use rate of the RE 1B may be determined, and when the resource use rate exceeds the predetermined level, the BB unit 11A of the REC 1A may be selected.

Specific Example 5

The selection of one of the BB units 11A and 11B to be used is performed based on the processing capacity of the REC 1A or the RE 1B. For example, when the processing capacity of the RE 1B is less than a predetermined level, the BB unit 11A of the REC 1A may be selected. This selection condition is effective when the processing capacity of the BB unit 11B is smaller than that of the BB unit 11A. Since the amount of traffic to be processed by the RE 1B varies depending on the installation location of the RE 1B, the processing capacity required for the RE 1B also varies. Accordingly, when the RE 1B is arranged at a high traffic location and the processing capacity of the BB unit 11B is not sufficient, the BB unit 11A of the REC 1A may be selected.

Specific Example 6

The selection of one of the BB units 11A and 11B to be used is performed based on a power supply status with respect to the REC 1A. For example, when a charging status of a battery which supplies power to the REC 1A, i.e., a charge amount or a charged percentage, exceeds a predetermined level, the BB unit 11A of the REC 1A may be selected. On the other hand, when the charging status of the battery which supplies power to the REC 1A is less than the predetermined level, the BB unit 11B of the RE 1B may be selected.

Specific Example 7

The selection of one of the BB units 11A and 11B to be used is performed based on a power supply status with respect to the RE 1B. For example, when the RE 1B can be supplied with power from a power generating device capable of self-generation, such as photovoltaic power generation or wind power generation, the BB unit 11B of the RE 1B may be selected.

Specific Example 8

The selection of one of the BB units 11A and 11B to be used is performed based on a security level or a QoS class of user data. Specifically, the BB unit 11B of the RE 1B may be selected for bearers requiring a high security level and for bearers to which a high QoS class is set, and the BB unit 11A of the REC 1A may be selected for the other bearers. In this case, it is preferable that a termination point of a bearer (e.g., an S1 bearer) encrypted between the upper network and the radio base station 1 be selectable between the REC 1A and the RE 1B.

The specific examples 1 to 8 of the selection conditions described above are illustrated by way of example only, and other selection conditions may also be used, as a matter of course. Further, the specific examples 1 to 8 of the selection conditions described above and other optional selection conditions can be combined as appropriate and used.

As described above, the BB units 11A and 11B are alternatively used for digital baseband signal processing for the user data pertaining to a mobile station connected to the RE 1B. The signal processing performed by the BB units 11A and 11B may be a part of the entire layer-2 and layer-1 (physical layer) digital signal processing to be performed on the user data. In this case, the other baseband signal processing, which is not performed by the BB unit 11A and the BB unit 11B, is performed by other signal processing units (not shown).

For example, the REC 1A and the RE 1B each may be equipped with a BB-PHY unit that performs baseband signal processing (e.g., channel coding/decoding and modulation/demodulation) on the physical layer, and one of the BB-PHY units may be alternatively used. The BB-PHY units correspond to the BB units 11A and 11B. In this case, the REC 1A may be equipped with a layer-2 unit that performs baseband signal processing (e.g., processing of the RLC sublayer and the MAC sublayer) for the layer-2, and the layer-2 unit may perform the layer-2 processing relating to the plurality of REs 1B in a centralized manner. Such modifications will be described in the following second to eighth embodiments.

Although not shown in FIG. 1, the layout of a function for terminating a bearer established with the upper network can be modified in various manners. Further, the layout of the buffer referred to by the scheduler 20 for dynamic scheduling of the downlink can also be modified in various manners. In other words the bearer termination function and the buffer can be appropriately distributed between the REC 1A and the RE 1B. Various additional effects can be obtained by adjusting the layout of these functional units. Various aspects of the layout of these functional units will be described in the following second to eighth embodiments.

As described above, the radio base station 1 according to this embodiment includes the BB units 11A and 11B, and is configured to select one of the BB units 11A and 11B for digital baseband signal processing for user data pertaining to each mobile station connected to the RE 1B. Accordingly, the radio base station 1 can select which one of the REC 1A and the RE 1B is used to perform at least a part of the baseband signal processing, depending on the need to be preferentially met among a plurality of needs, such as a need for reducing the amount of traffic between the REC and the RE, and a need for achieving a cooperative control among a plurality of REs 1B.

Second Embodiment

Figure 2:
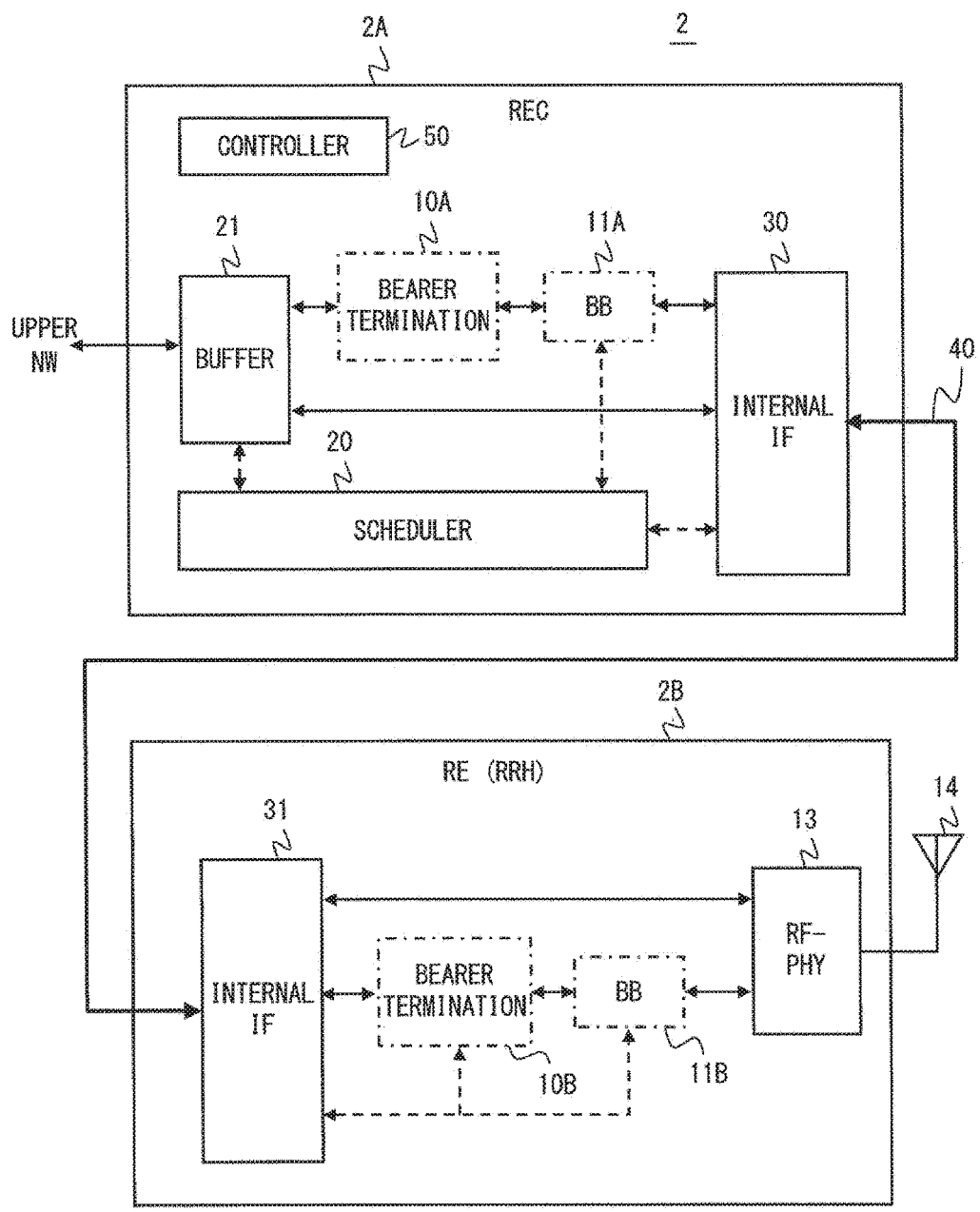
FIG. 2 is a block diagram showing a configuration example of a radio base station according to a second embodiment of the invention.

FIG. 2 is a block diagram showing a configuration example of a radio base station 2 according to this embodiment. The radio base station 2 includes a first part, i.e., a radio equipment controller (REC) 2A, and at least one second part, i.e., a radio equipment (RE) 2B. Though only one RE 2B is illustrated in FIG. 2, a plurality of REs 2B may be connected to the REC 2A as shown in FIG. 1. The radio base station 2 differs from the above-described radio base station 1 in that bearer termination units 10A and 10B are arranged in the REC 2A and the RE 2B, respectively. The bearer termination units 10A and 10B can terminate a bearer established between the upper network (e.g., RNC of UMTS, EPC of E-UTRA) and the base station 2 so as to transfer user data. In general, a bearer (e.g., an S1 bearer of E-UTRA) for transferring user data is encrypted with a tunneling protocol (e.g., IPsec). A bearer is established for each data flow (e.g., a Packet Data Network (PDN) connection of E-UTRA) between each mobile station and an external network. Accordingly, the bearer termination units 10A and 10B can terminate a plurality of encrypted bearers between the upper network and the base station 2, receive the downlink user data pertaining to a plurality of mobile stations from the upper network, and send the uplink user data pertaining to the plurality of mobile stations to the upper network.

Further, the radio base station 2 is configured to select termination points of a plurality of bearers between the REC 2A and the RE 2B. One of the bearer termination units 10A and 10B to be used may be determined in accordance with the selection of one of the BB units 11A and 11B to be used. In other words, when the BB unit 11A of the REC 2A is used for the digital baseband signal processing for the user data, the bearer termination unit 10A is used for the bearer termination. On the other hand, when the BB unit 11B of the RE 2B is used for the digital baseband signal processing, the bearer termination unit 10B is used for the bearer termination.

When the bearer is terminated in the RE 2B, the radio base station 2 transfers the encrypted bearer data (e.g., S1 bearer data) via the transmission line 40 from the REC 2A to the RE 2B. This allows the radio base station 2 to enhance security between the REC 2A and the RE 2B. As described above, the RE 2B is expected to be arranged at a remote location that is easily accessed by a third party. Transmission of the encrypted bearer data, instead of the user data, makes it possible to protect the user data against unauthorized access.

The selection between the bearer termination units 10A and 10B, that is, the selection of a bearer termination point, can be performed in accordance with, for example, "specific example 8" of the selection conditions described above. In this case, a termination point may be individually selected for each bearer. Specifically, bearers requiring a high security level and bearers to which a high QoS class is set may be terminated in the RE 2B. The other bearers may be terminated in the REC 2A. The selection between the bearer termination units 10A and 10B, as well as the selection between the BB units 11A and 11B, may be performed based on at least one of the other specific examples 1 to 7.

Alternatively, for example, bearer termination points may be selected based on the security level of the transmission line 40 between the REC 2A and the RE 2B. Specifically, when the security level of the transmission line 40 is relatively high, the bearers may be terminated in the REC 2A, and when the security level of the transmission line 40 is relatively low, the bearers may be terminated in the RE 2B. The case where the security level of the transmission line 40 is relatively high is, for example, when the transmission line 40 is a dedicated line of a telecom carrier, or when the transmission line 40 is laid on the premises managed by the telecom carrier. The case where the security level of the transmission line 40 is relatively low is, for example, when the transmission line 40 is a general public line, or when the transmission line 40 is laid in a place that is not under full control.

Bearer termination points may be selected at the time of setting up the radio base station 2. Alternatively, bearer termination points may be selected according to switching of the transmission line 40, for example, switching between a main transmission line and a backup transmission line. Specifically, a controller 50 arranged in the radio base station 2 may switch termination points according to the respective security levels of the main transmission line and the backup transmission line when the main transmission line and the backup transmission line have different security levels. The switching of bearer termination points may be performed according to an instruction from an external device (e.g., a resource control device or an OAM system), instead of the controller 50.

Next, a layout of a buffer 21 shown in FIG. 2 will be described. The buffer 21 temporarily stores the downlink user data which has arrived from the upper network, and is referred to by the scheduler 20 for the dynamic scheduling. In the configuration example of FIG. 2, the buffer 21 is arranged in the REC 2A. Accordingly, the buffer 21 shown in FIG. 2 may store the encrypted bearer data for each mobile station, for each bearer, for each QoS class, or for each mobile station and each QoS class. However, as described in detail in the first embodiment, such a layout of the buffer 21 is illustrated by way of example only. The buffer 21 may be arranged between the bearer termination unit 10A and the BB unit 11A.

The buffer 21 may be arranged so as to store the user data stream obtained by performing the data compression and encryption in the layer-2. In the case of E-UTRA, the user data stream obtained by performing the data compression and encryption in the layer-2 corresponds to the PDCP Protocol Data Units (PDUs), which are a data stream obtained after the PDCP sublayer is processed (i.e., radio bearer data). Alternatively, the buffer 21 may be arranged so as to store the user data stream obtained by performing segmentation/concatenation and addition of a layer-2 header in the layer-2. In the case of E-UTRA, the user data stream obtained by performing the segmentation/concatenation and addition of a layer-2 header corresponds to the RLC PDUs, which are a data stream obtained after the Radio-Link Control (RLC) sublayer is processed (i.e., a logical channel). In such cases, the buffer 21 may be arranged in each of the REC 2A and the RE 2B and may be used in accordance with the selection between the BB units 11A and 11B.

The scheduler 20, however, needs to recognize the storage status of the buffer 21 during the dynamic scheduling for the downlink. Accordingly, both the buffer 21 and the scheduler 20 are arranged in the REC 2A, thereby facilitating the dynamic scheduling. Moreover, the amount of control data to be transferred between the internal interfaces 30 and 31 can be reduced. The REC 2A (the internal interface 30) may selectively transmit data selected by the scheduler 20 from the downlink user data or from the data stream including the downlink user data stored in the buffer 21.

The radio base station 2 is configured to select one of the BB units 11A and 11B to be used. Accordingly, the radio base station 2 can select which one of the REC 2A and RE 2B is used to perform at least a part of the baseband signal processing, depending on the need to be preferentially met among the plurality of needs, as in the radio base station 1.

Further, in this embodiment, when the BB unit 11B is used, the bearer termination is also performed at the RE 2B. Accordingly, the use of the bearer termination unit 10B and the BB unit 11B allows the radio base station 2 to enhance the security of the transmission line 40. On the other hand, when a reduction in the amount of traffic between the REC and the RE should be met in priority to the enhancement of the security of the transmission line 40, the radio base station 2 can meet the need by using the bearer termination unit 10A and the BB unit 11A.

Figure 3A:
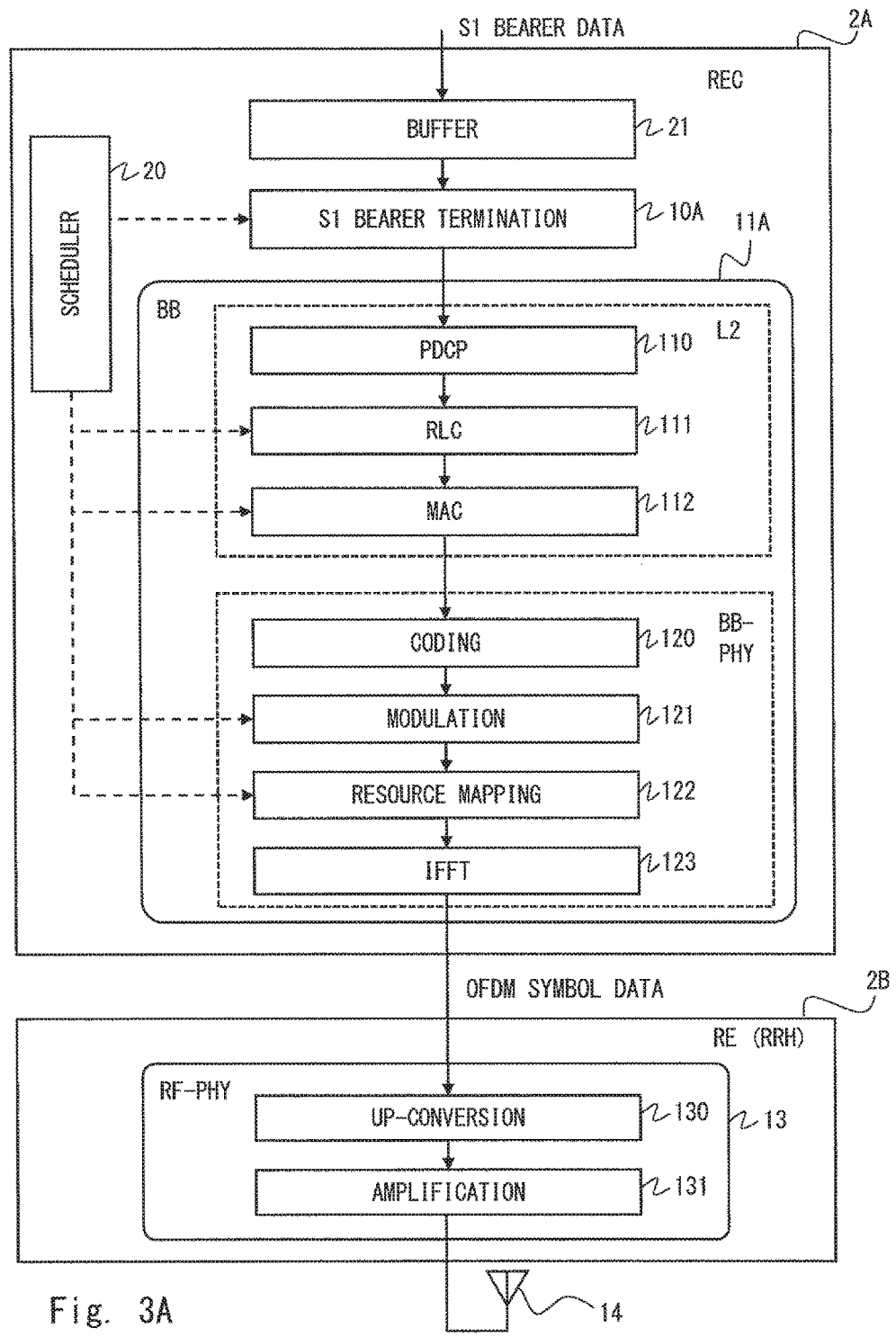
FIG. 3A is a diagram showing a protocol structure and a functional layout of the radio base station according to the second embodiment of the invention.
Figure 3B:
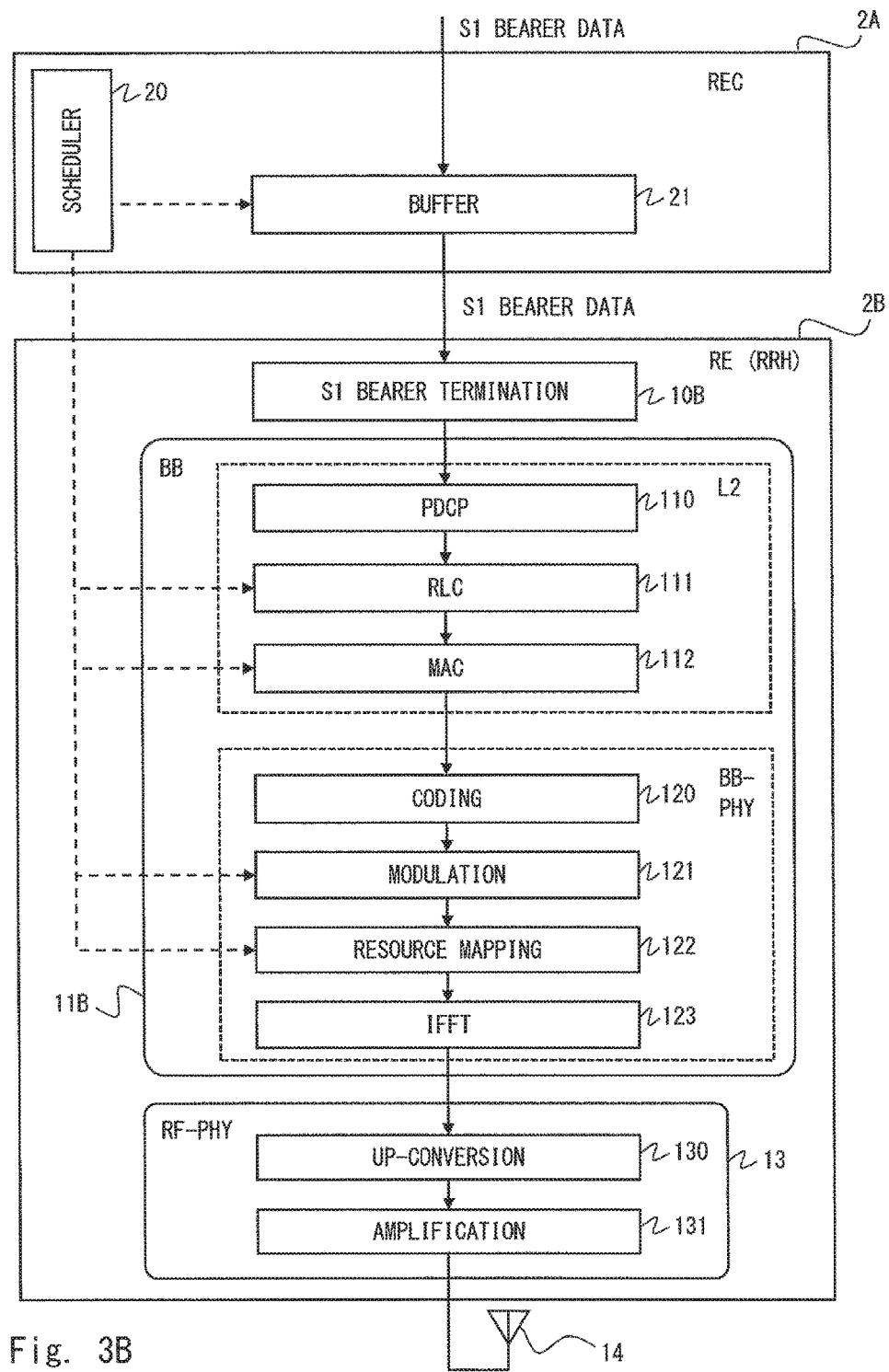
FIG. 3B is a diagram showing a protocol structure and a functional layout of the radio base station according to the second embodiment of the invention.

FIGS. 3A and 3B show the details of the functional layout in the radio base station 2 regarding the downlink transmission of user data in the E-UTRA. The functional layout shown in FIG. 3A corresponds to the case where the bearer termination unit 10A and the BB unit 11A of the REC 2A are used in the configuration example of FIG. 2. On the other hand, the functional layout shown in FIG. 3B corresponds to the case where the bearer termination unit 10B and the BB unit 11B of the RE 2B are used. In FIGS. 3A and 3B, the BB units 11A and 11B each include three sub-units related to the layer-2 processing, i.e., a PDCP unit 110, an RLC unit 111, and a MAC unit 112. The PDCP unit 110 performs processing on the PDCP sublayer. The RLC unit 111 performs processing on the RLC sublayer. The MAC unit 112 performs processing on the MAC sublayer. The BB units 11A and 11B each further include four sub-units related to the baseband physical layer (BB-PHY) processing, i.e., a coding unit 120, a modulation unit 121, a resource mapping unit 122, and an IFFT unit 123. The RF-PHY unit 13 includes an up-converter 130 and an amplifier 131. In the example of FIG. 3A, the OFDM symbol data (baseband OFDM signal) is transferred from the REC 2A to the RE 2B. In the example of FIG. 3B, the S1 bearer data is transferred from the REC 2A to the RE 2B.

Third Embodiment

Figure 4:
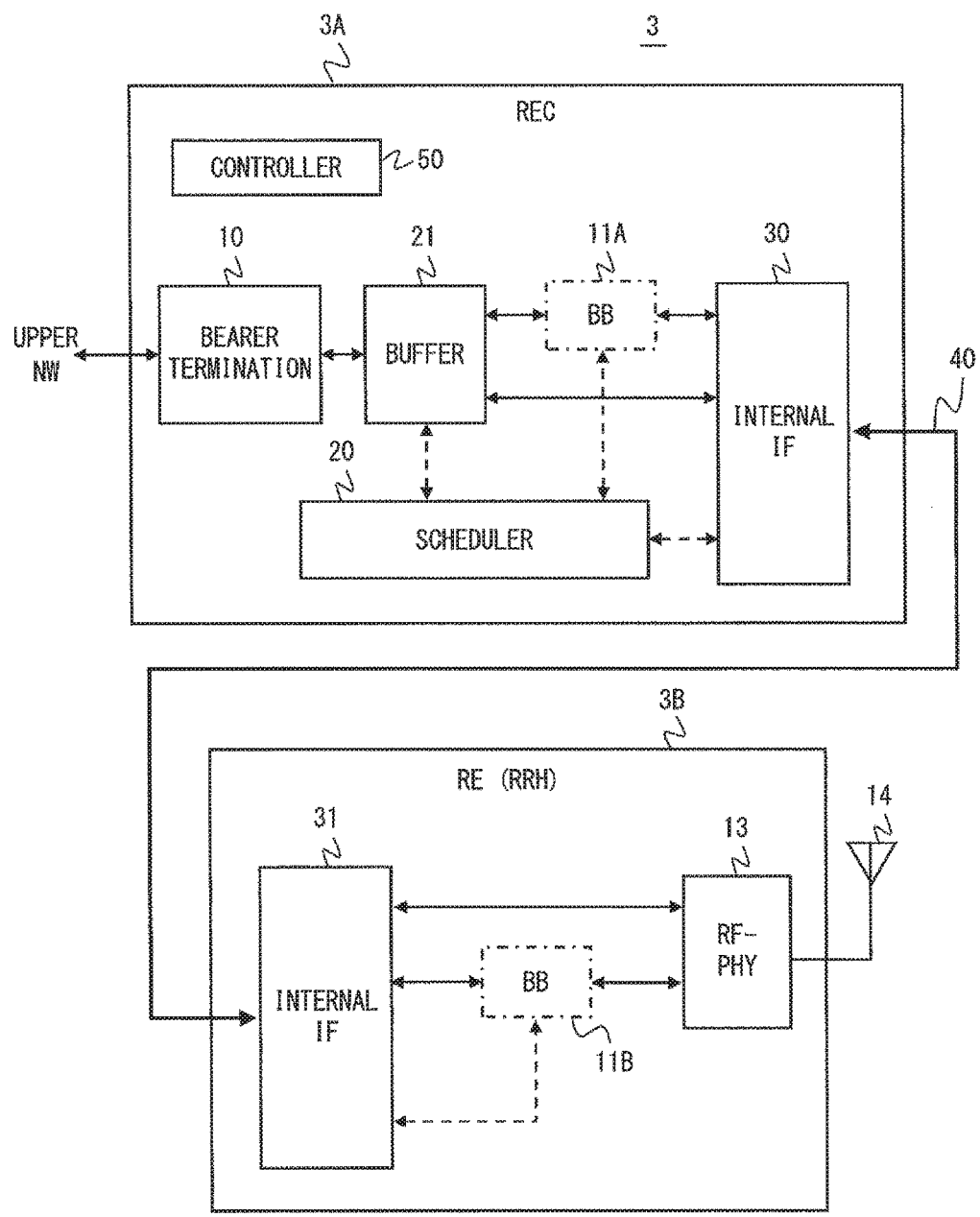
FIG. 4 is a block diagram showing a configuration example of a radio base station according to a third embodiment of the invention.

FIG. 4 is a block diagram showing a configuration example of a radio base station 3 according to this embodiment. The radio base station 3 includes a first part, i.e., a radio equipment controller (REC) 3A, and at least one second part, i.e., a radio equipment (RE) 3B. Though only one RE 3B is illustrated in FIG. 4, a plurality of REs 3B may be connected to the REC 3A as shown in FIG. 1. The radio base station 3 differs from the above-described radio base station 1 in that the bearer termination unit 10 is arranged in the REC 3A. The bearer termination unit 10 terminates a bearer, which is established between the upper network (e.g., RNC of UMTS, EPC of E-UTRA) and the base station 3, so as to transfer user data.

In the example of FIG. 4, the buffer 21 is arranged between the bearer termination unit 10 and the BB units 11A and 11B. Accordingly, the buffer 21 stores the user data (e.g., IP packets) itself before performing data compression, encryption, segmentation and multiplexing in the layer-2 processing. However, such a layout of the buffer 21 is illustrated by way of example only.

In FIG. 4, the REC 3A may be configured to perform processing (e.g., IP header compression, encryption) on the PDCP sublayer at the bearer termination unit 10. In this case, the BB units 11A and 11B may perform other baseband signal processing (i.e., processing of RLC and MAC sublayers, and BB-PHY processing) except for the PDCP sublayer. In this case, the buffer 21 may store the PDCP PDUs for each mobile station, for each bearer, for each QoS class, or for each mobile station and each QoS class.

The radio base station 3 is configured to select one of the BB units 11A and 11B to be used. Accordingly, the radio base station 3 can select which one of the REC 3A or the RE 3B is used to perform at least a part of the baseband signal processing, depending on the need to be preferentially met among the plurality of needs, as in the radio base station 1.

Furthermore, in contrast to the second embodiment described above, the REC 3A performs the bearer termination even when the BB unit 11B of the RE 3B is used. Accordingly, the header added to the encrypted bearer data (e.g., S1 bearer data) can be reduced. This leads to a reduction in the data amount to be transferred between the REC 3A and the RE 3B, as compared with the case of transmitting the bearer data to the RE 3B.

Figure 5A:
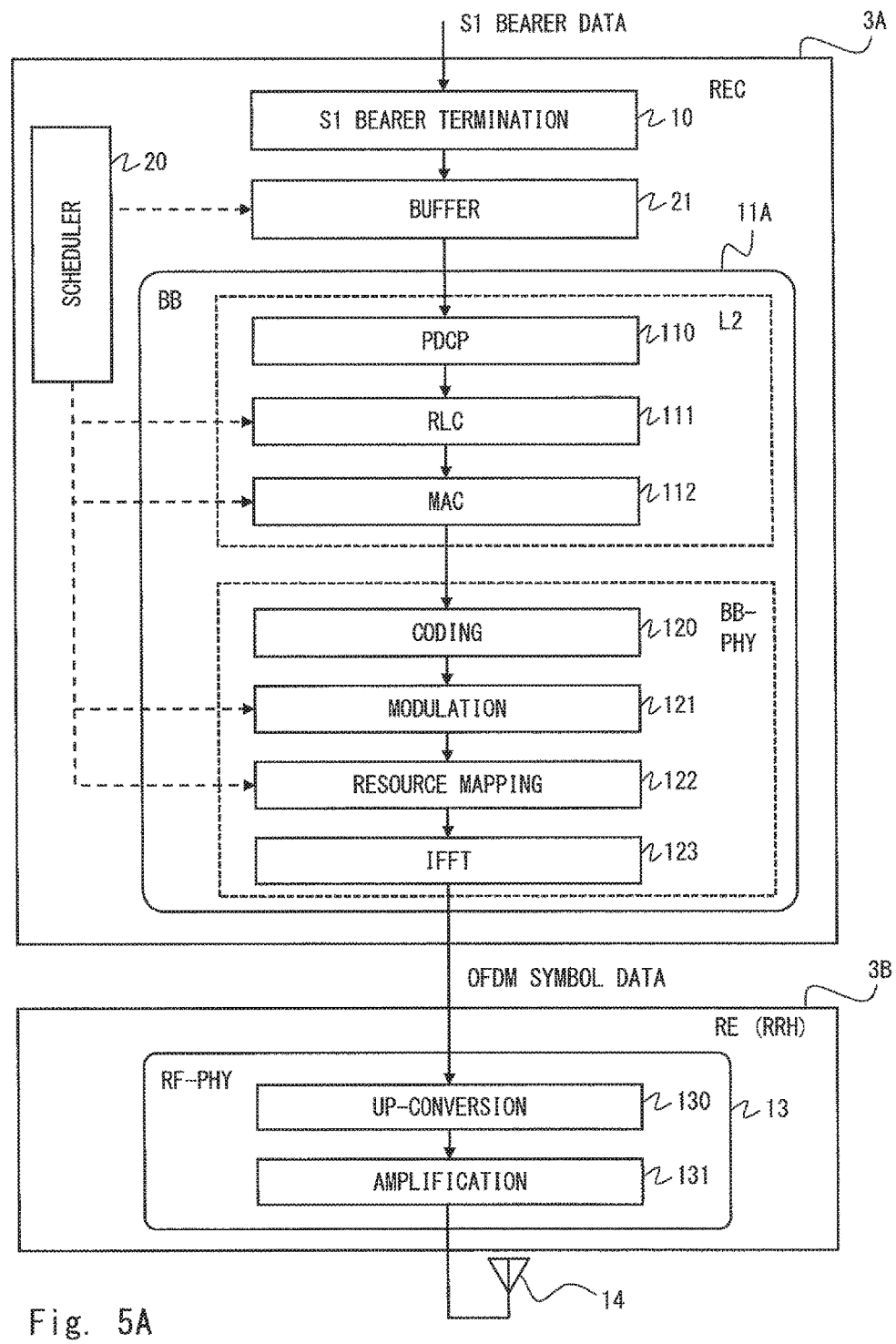
FIG. 5A is a diagram showing a protocol structure and a functional layout of the radio base station according to the third embodiment of the invention.
Figure 5B:
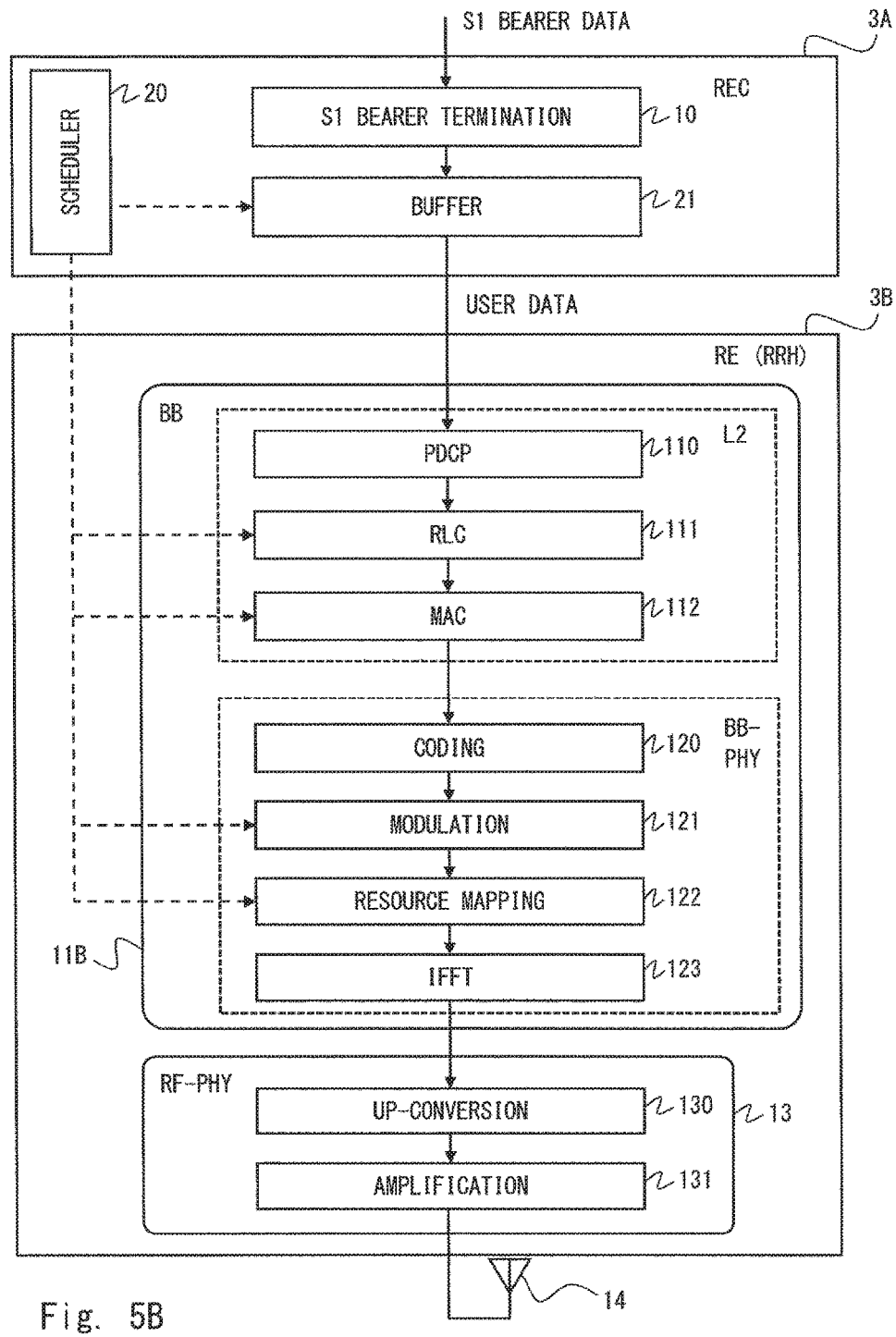
FIG. 5B is a diagram showing a protocol structure and a functional layout of the radio base station according to the third embodiment of the invention.

FIGS. 5A and 5B show the details of the functional layout in the radio base station 3 regarding the downlink transmission of user data in the E-UTRA. The functional layout shown in FIG. 5A corresponds to the case where the BB unit 11A of the REC 3A is used in the configuration example of FIG. 4. On the other hand, the functional layout shown in FIG. 5B corresponds to the case where the BB unit 11B of the RE 3B is used. In the example of FIG. 5A, the OFDM symbol data (baseband OFDM signal) is transferred from the REC 3A to the RE 3B. In the example of FIG. 5B, the user data is transferred from the REC 3A to the RE 3B.

Fourth Embodiment

Figure 6:
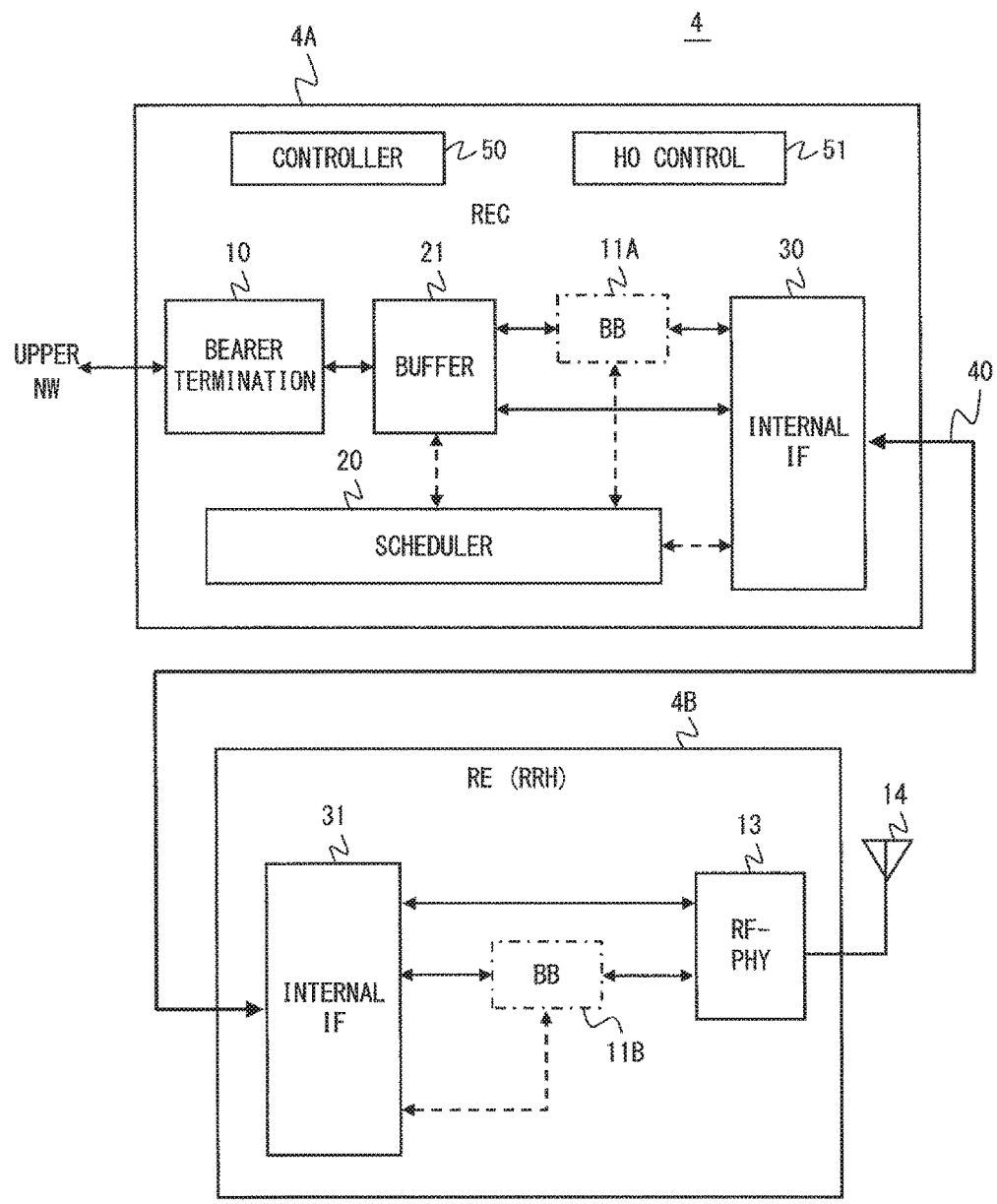
FIG. 6 is a block diagram showing a configuration example of a radio base station according to a fourth embodiment of the invention.

FIG. 6 is a block diagram showing a configuration example of a radio base station 4 according to this embodiment. The configuration example shown in FIG. 6 is a modification of the radio base station 3 shown in FIG. 4. The radio base station 4 includes a first part, i.e., a radio equipment controller (REC) 4A, and at least one second part, i.e., a radio equipment (RE) 4B. Though only one RE 4B is illustrated in FIG. 6, a plurality of REs 5B may be connected to the REC 4A as shown in FIG. 1. The radio base station 4 differs from the radio base station 3 shown in FIG. 4 in that the REC 4A includes a handover (HO) control unit 51. The configuration and functional layout of the RE 4B are the same as those of the RE 3B shown in FIGS. 4, 5A, and 5B.

When a mobile station communicating over an air interface performs handover to another base station (target base station), the HO control unit 51 transfers the downlink user data pertaining to the mobile station held in the buffer 21, or the data stream including the downlink user data, to the target base station. The transfer of the user data to the target base station is performed in the same manner as in a typical handover procedure. Specifically, the user data may be transferred to the target base station by using an interface (e.g., an X2 interface) available between base stations, or may be transferred via an upper network.

In FIG. 6, the REC 4A may be configured to perform processing (e.g., IP header compression, encryption) on the PDCP sublayer at the bearer termination unit 10. In this case, the BB units 11A and 11B may perform other baseband signal processing (i.e., processing of RLC and MAC sub-layers, and BB-PHY processing) except for the PDCP sublayer. In this case, the buffer 21 may store the PDCP PDUs for each mobile station, for each bearer, for each QoS class, or for each mobile station and each QoS class.

In the configuration example shown in FIG. 6, the REC 4A buffers the user data or the data stream (e.g., PDCP PDUs) containing the user data, thereby facilitating the data transfer to the target base station during the handover. In other words, there is no need to transfer the data from the RE 4B to the REC 4A during the handover. When a mobile station moves between REs 4B connected to the REC 4A, it is only necessary for the REC 4A to change the transmission destination of the buffered user data or the data stream (e.g., PDCP PDUs) containing the user data to the RE 4B as the handover target. This makes it possible to easily provide continuous services by following the movement of a mobile station.

Fifth Embodiment

Figure 7:
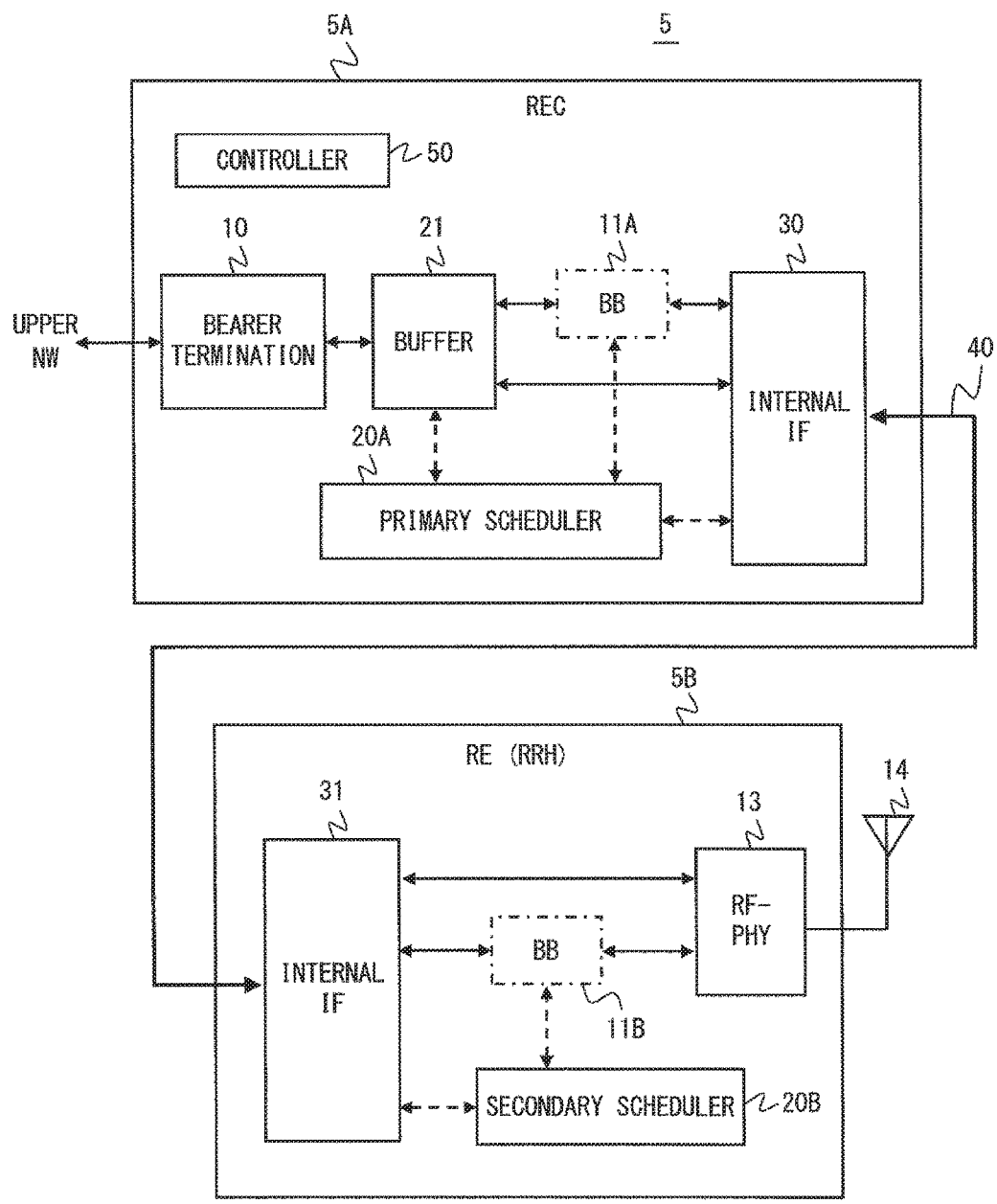
FIG. 7 is a block diagram showing a configuration example of a radio base station according to a fifth embodiment of the invention.

FIG. 7 is a block diagram showing a configuration example of a radio base station 5 according to this embodiment. The configuration example shown in FIG. 7 is a modification of the radio base station 3 shown in FIG. 4. The radio base station 5 includes a first part, i.e., a radio equipment controller (REC) 5A, and at least one second part, i.e., a radio equipment (RE) 5B. Though only one RE 5B is illustrated in FIG. 7, a plurality of REs 5B may be connected to the REC 5A as shown in FIG. 1. The radio base station 5 differs from the radio base station 3 shown in FIG. 4 in that the REC 5A includes a primary scheduler 20A and the RE 5B includes a secondary scheduler 20B.

In the radio base station 5, the primary scheduler 20A is arranged in the REC 5A. Accordingly, the radio base station 5 can perform cooperative scheduling at the REC 5A, as in the radio base station 1. Further, in this embodiment, the secondary scheduler 20B performs a part of the processing related to dynamic scheduling. The secondary scheduler 20B operates in a cooperative manner with the primary scheduler 20A for the dynamic scheduling. Specific examples of dividing the functions between the primary scheduler 20A and the secondary scheduler 20B will be described below.

In a first example, the secondary scheduler 20B calculates a parameter used for dynamic scheduling based on the radio communication quality of the air interface, and sends the parameter to the primary scheduler 20A. The main scheduling techniques, such as PF scheduling and Max-C/I scheduling, use the radio communication quality of the air interface. For example, PF scheduling uses, as a parameter, a ratio between an instantaneous predicted radio communication quality and a previous average radio communication quality of a mobile station so as to secure the fairness of transmission opportunities among mobile stations. This parameter is called a PF metric. Examples of the radio communication quality used for calculation of the PF metric include a data rate and a signal-to-interference ratio (SINR). The PF metric is calculated as, for example, a ratio between an instantaneous SINR and an average SINR (i.e., instantaneous SINR/average SINR).

The secondary scheduler 20B calculates a parameter, such as the PF metric, using the radio communication quality, thereby reducing the processing load of the primary scheduler 20A. Further, the data amount to be transmitted from the RE 5B to the REC 5A by using the transmission line 40 can be reduced. In the case of calculating a parameter (e.g., PF metric) in the REC 5A, it is necessary to send the measurement results of the current and previous radio communication qualities from the RE 5B to the REC 5A. However, when the secondary scheduler 20B calculates a parameter, only the calculated parameter may be sent instead of the measurement results of the current and previous radio communication qualities.

Figure 8:
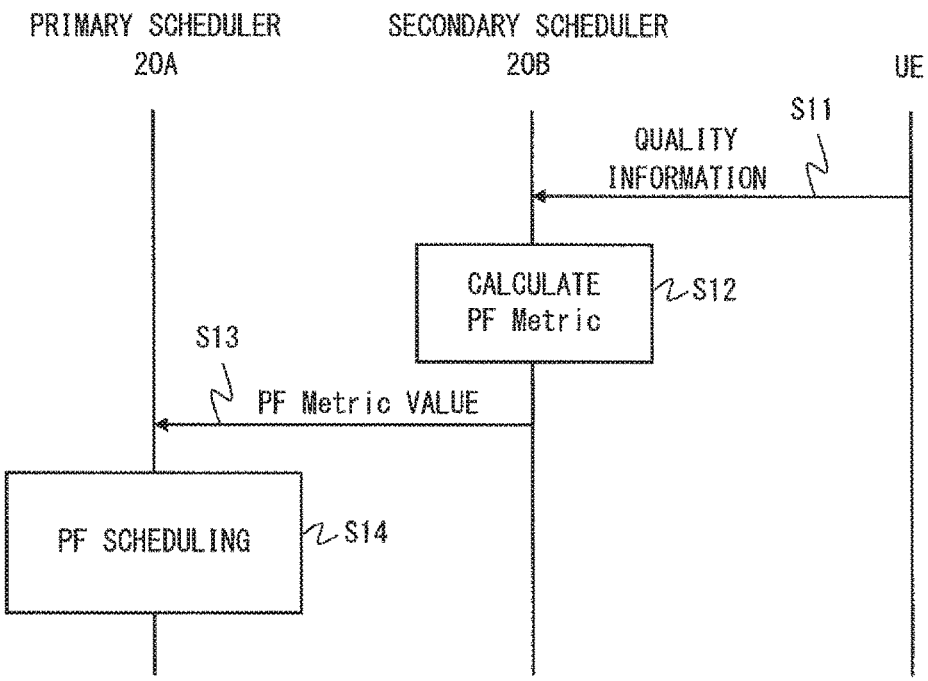
FIG. 8 is a sequence diagram showing operation examples of a primary scheduler and a secondary scheduler according to the fifth embodiment of the invention.

FIG. 8 is a sequence diagram showing operations of the primary scheduler 20A and the secondary scheduler 20B when the secondary scheduler 20B calculates the PF metric. In step S11, a mobile station (UE) sends quality information. This quality information indicates the downlink radio communication quality measured by the mobile station. In step S12, the secondary scheduler 20B calculates the PF metric by using the quality information received from the mobile station. In step S13, the secondary scheduler 20B sends the PF metric to the primary scheduler 20A. In step S14, the primary scheduler 20A executes dynamic scheduling by using the PF metric received from the secondary scheduler 20B, and determines mobile stations or user data to be allocated to downlink radio resources.

Next, a second example of dividing the functions between the primary scheduler 20A and the secondary scheduler 20B will be described. In the second example, the secondary scheduler 20B executes scheduling for H-ARQ re-transmission or scheduling for re-transmission of the RLC sublayer. Specifically, the secondary scheduler 20B buffers the downlink transmitted data, and when the mobile station requests re-transmission, the secondary scheduler 20B performs re-transmission based on a re-transmission instruction from the primary scheduler 20A. For example, the secondary scheduler 20B may allocate, for the re-transmission, the same radio resource as that used for the transmission immediately before. This contributes to a reduction in the processing load of the primary scheduler 20A. Further, since there is no need to transfer the re-transmitted data from the REC 5A to the RE 5B, the data amount to be transmitted via the transmission line 40 can be reduced.

Figure 9:
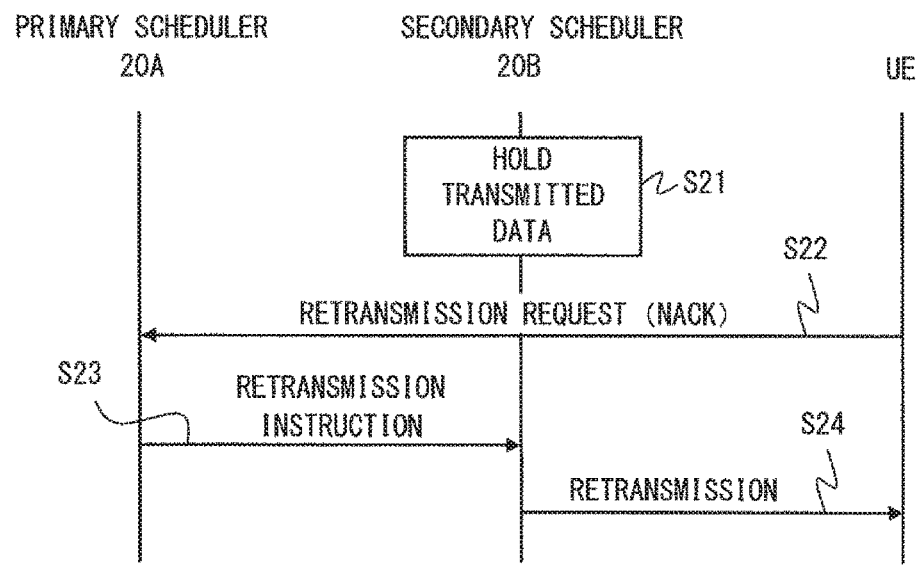
FIG. 9 is a sequence diagram showing operation examples of the primary scheduler and the secondary scheduler according to the fifth embodiment of the invention.

FIG. 9 is a sequence diagram showing operations of the primary scheduler 20A and the secondary scheduler 20B when the secondary scheduler 20B controls re-transmission. In step S21, the secondary scheduler 20B buffers the downlink transmitted data. In step S22, the mobile station sends a re-transmission request (e.g., NACK), and the primary scheduler 20A receives the re-transmission request. In step S23, the primary scheduler 20A instructs the secondary scheduler 20B to perform re-transmission. In step S24, the secondary scheduler 20B performs re-transmission according to the instruction from the primary scheduler 20A.

As is apparent from the descriptions of the first to fourth embodiments, the functional layout shown in the configuration example of FIG. 7 is illustrated by way of example only. For example, as described in the second embodiment, the bearer termination units 10 (10A and 10B) may be arranged in the REC 5A and the RE 5B, and one of them may be alternatively used. Further, the PDCP processing may be performed by the bearer termination units 10. Furthermore, the buffer 21 may be arranged on the upper network side relative to the bearer termination units 10.

Sixth Embodiment

The first to fifth embodiments illustrate examples in which the REC executes dynamic scheduling, regardless of which one of the REC and the RE plays a role in performing the digital baseband signal processing. Thus, the REC can perform cooperative scheduling in a centralized manner in consideration of the radio resources necessary for respective REs 1B. Accordingly, the radio base stations 1 to 5 can easily perform the cooperative control between cells, as compared with the case of performing scheduling in a distributed manner in the respective REs 1B. On the other hand, this embodiment illustrates an example in which the RE performs dynamic scheduling when the BB unit 11B is used for the digital baseband signal processing for user data.

Figure 10:
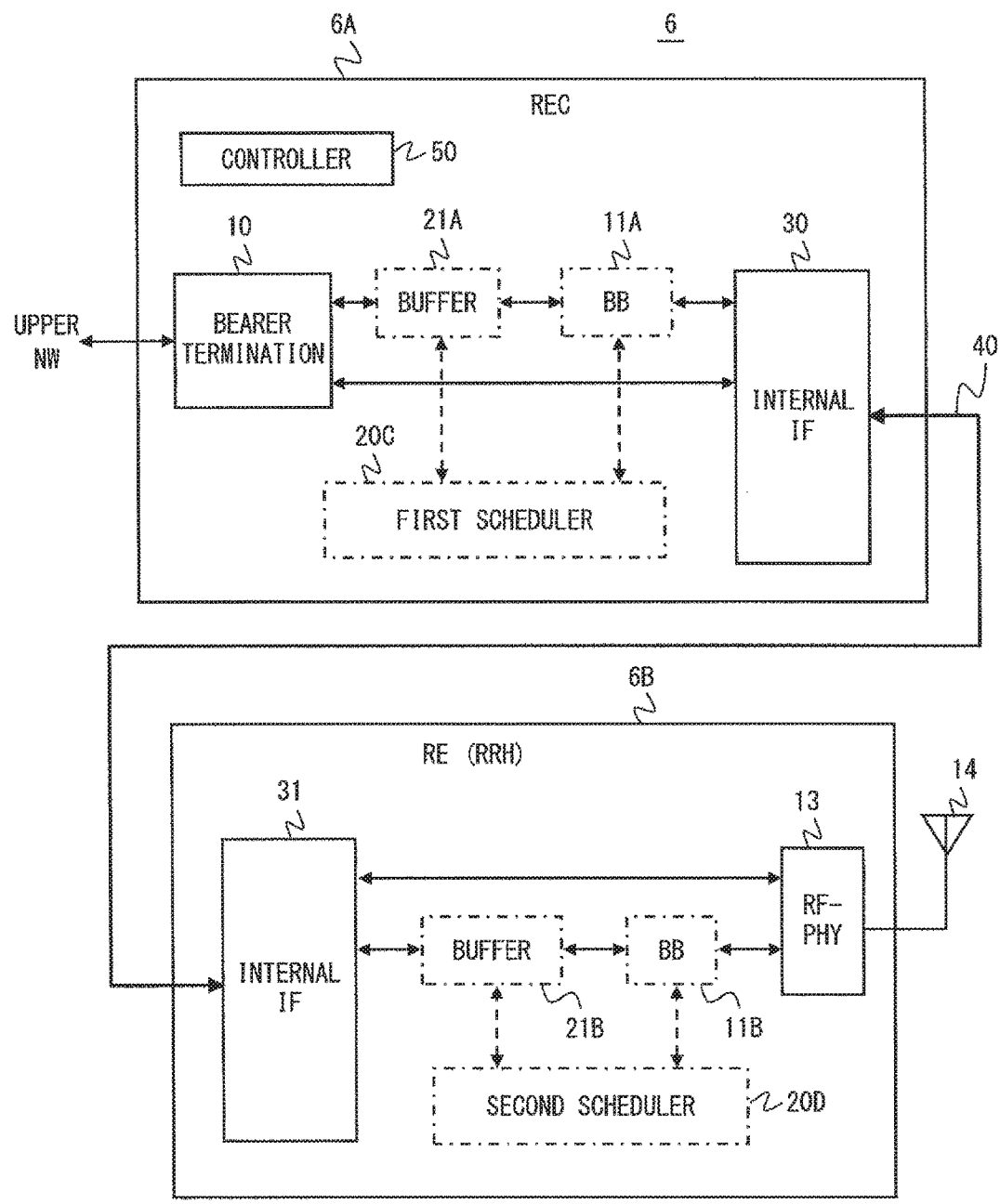
FIG. 10 is a block diagram showing a configuration example of a radio base station according to a sixth embodiment of the invention.

FIG. 10 is a block diagram showing a configuration example of a radio base station 6 according to this embodiment. The radio base station 6 includes a first part, i.e., a radio equipment controller (REC) 6A, and at least one second part, i.e., a radio equipment (RE) 6B. Though only one RE 6B is illustrated in FIG. 10, a plurality of REs 6B may be connected to the REC 6A as shown in FIG. 1. The REC 6A includes a first scheduler 20C and a buffer 21A. The RE 6B includes a second scheduler 20D and a buffer 21B.

Each of the first scheduler 20C and the second scheduler 20D can perform dynamic scheduling for the downlink and uplink. The processing capacity of the second scheduler 20D may be smaller than that of the first scheduler 20C. This is because the first scheduler 20C should perform scheduling for a number of mobile stations connected to a plurality of REs 6B, whereas the second scheduler 20D only needs to perform scheduling for mobile stations connected to a single RE 6B.

The second scheduler 20D is capable of performing dynamic scheduling for mobile stations connected to the RE 6B, instead of the first scheduler 20C. The radio base station 6 is configured to select which one of the first scheduler 20C and the second scheduler 20D is used to perform dynamic scheduling for mobile stations connected to the RE 6B. The selection may be individually performed for each RE 6B, or may be collectively performed for a plurality of REs 6B connected to the REC 6A. When the first scheduler 20C executes dynamic scheduling, the buffer 21A and the BB unit 11A of the REC 6A are used. On the other hand, when the second scheduler 20D executes dynamic scheduling, the buffer 21B and the BB unit 11B of the RE 6B are used.

When the radio base station 6 requires, for example, the cooperative transmission and reception (e.g., CoMP) between a plurality of REs 6B and one mobile station, the first scheduler 20C, the buffer 21A, and the BB unit 11A of the REC 6A may be used for the dynamic scheduling. Therefore, the REC 6A can control the radio resources in a centralized manner for the plurality of REs 6B, thereby making it possible to relatively easily perform the cooperative transmission and reception (e.g., CoMP).

On the other hand, the radio base station 6 does not require the cooperative transmission and reception (e.g., CoMP) between a plurality of REs 6B and one mobile station, the second scheduler 20D, the buffer 21B, and the BB unit 11B of each RE 6B may be used for the dynamic scheduling. This leads to a reduction in the amount of traffic between the REC and the RRH. This also contributes to a reduction in power consumption of the REC 6A.

Figure 11A:
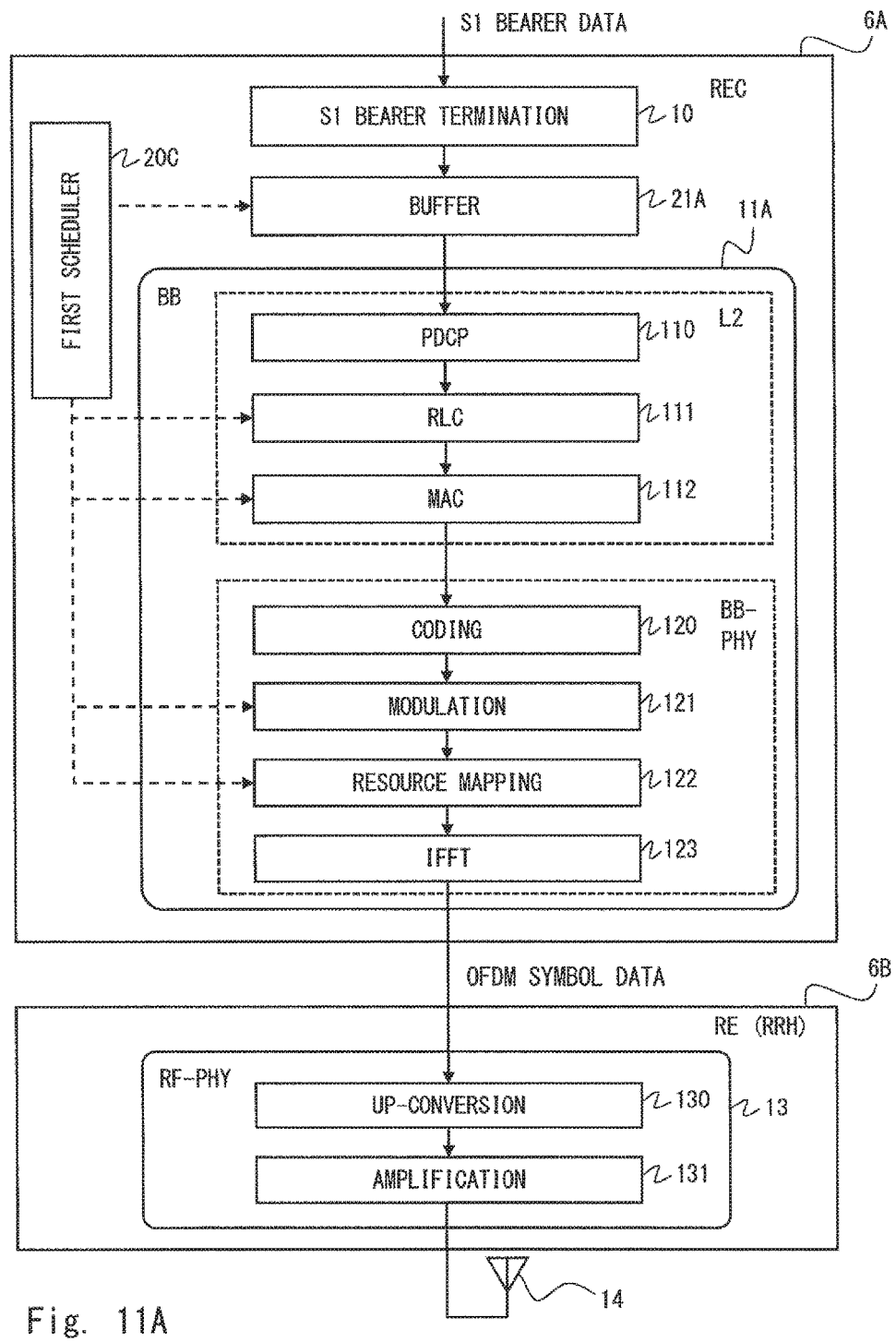
FIG. 11A is a diagram showing a protocol structure and a functional layout of the radio base station according to the sixth embodiment of the invention.
Figure 11B:
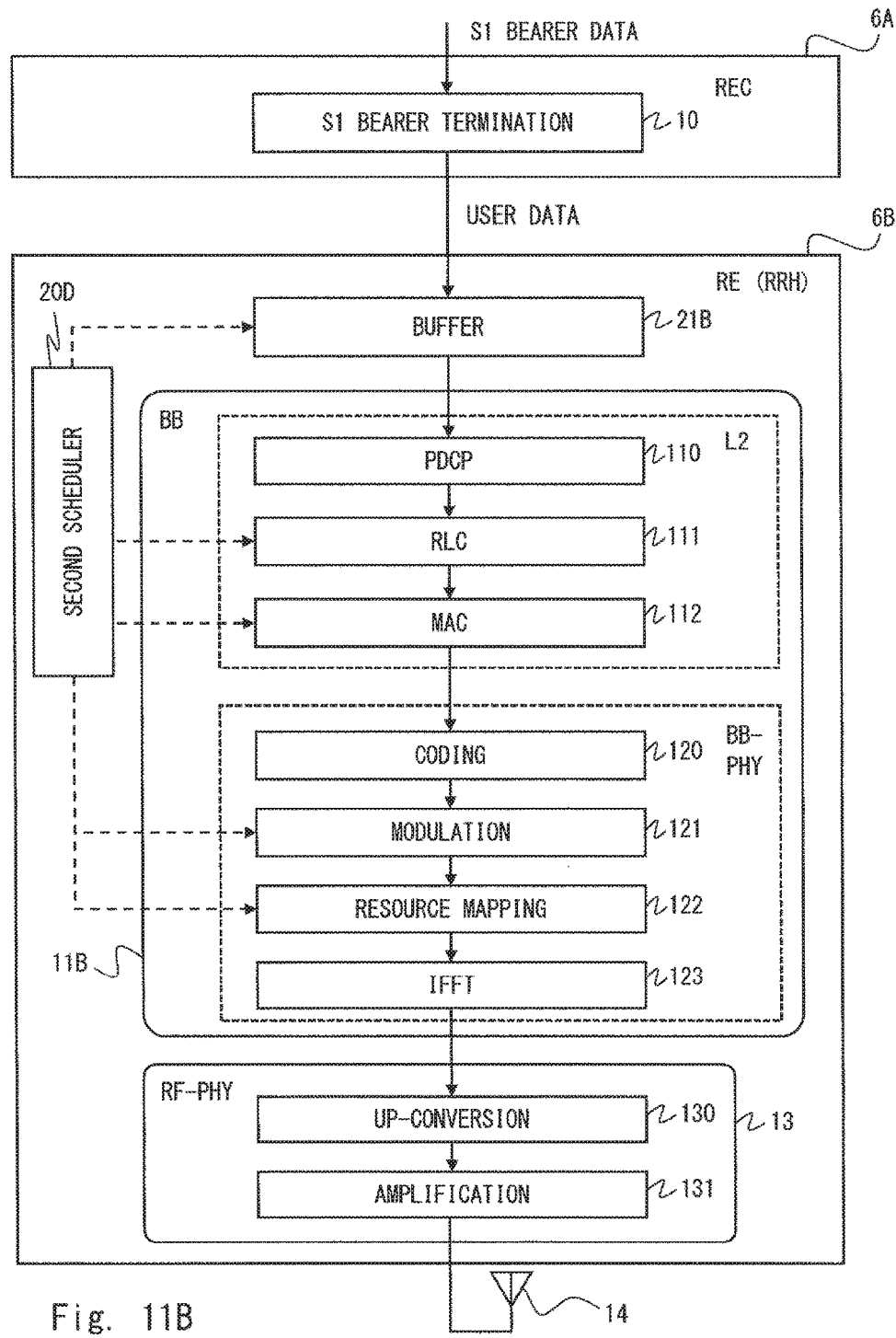
FIG. 11B is a diagram showing a protocol structure and a functional layout of the radio base station according to the sixth embodiment of the invention.

FIGS. 11A and 11B show the details of the functional layout in the radio base station 6 regarding the downlink transmission of user data in the E-UTRA. The functional layout shown in FIG. 11A corresponds to the case where the first scheduler 20C, the buffer 21A, and the BB unit 11A of the REC 6A are used in the configuration example of FIG. 10. On the other hand, the functional layout shown in FIG. 11B corresponds to the case where the second scheduler 20D, the buffer 21B, and the BB unit 11B of the RE 6B are used. In the example of FIG. 11A, the OFDM symbol data (baseband OFDM signal) is transferred from the REC 6A to the RE 6B. In the example of FIG. 11B, the user data is transferred from the REC 6A to the RE 6B.

The second scheduler 20D may be configured to be capable of performing only a part of the dynamic scheduling for mobile stations connected to the RE 1B, instead of performing the whole dynamic scheduling. For example, the first scheduler 20C may determine a range of radio resources that can be allocated to mobile stations connected to the RE 1B. In this case, the second scheduler 20D may dynamically allocate the resources to the mobile stations from the range of radio resources determined by the first scheduler 20C. Alternatively, for example, as in the configurations of the primary scheduler and the secondary scheduler described in the fifth embodiment, the first scheduler 20C may perform dynamic scheduling except for H-ARQ re-transmission, and the scheduler 20D may perform scheduling for the H-ARQ re-transmission. Furthermore, the second scheduler 20D may calculate a parameter used for dynamic scheduling based on the radio communication quality of the air interface, and may send the parameter to the first scheduler 20C. In this case, the first scheduler 20C may perform dynamic scheduling by using the parameter calculated by the second scheduler 20D.

Seventh Embodiment

As described above in the first embodiment, the digital baseband processing functions, which are arranged in both the REC and the RE, and one of which is alternatively used, may be a part of the layer-2 and physical layer digital signal processing to be performed on user data. This embodiment illustrates an example in which digital signal processing functions for the physical layer are arranged in both the REC and the RE.

Figure 12:
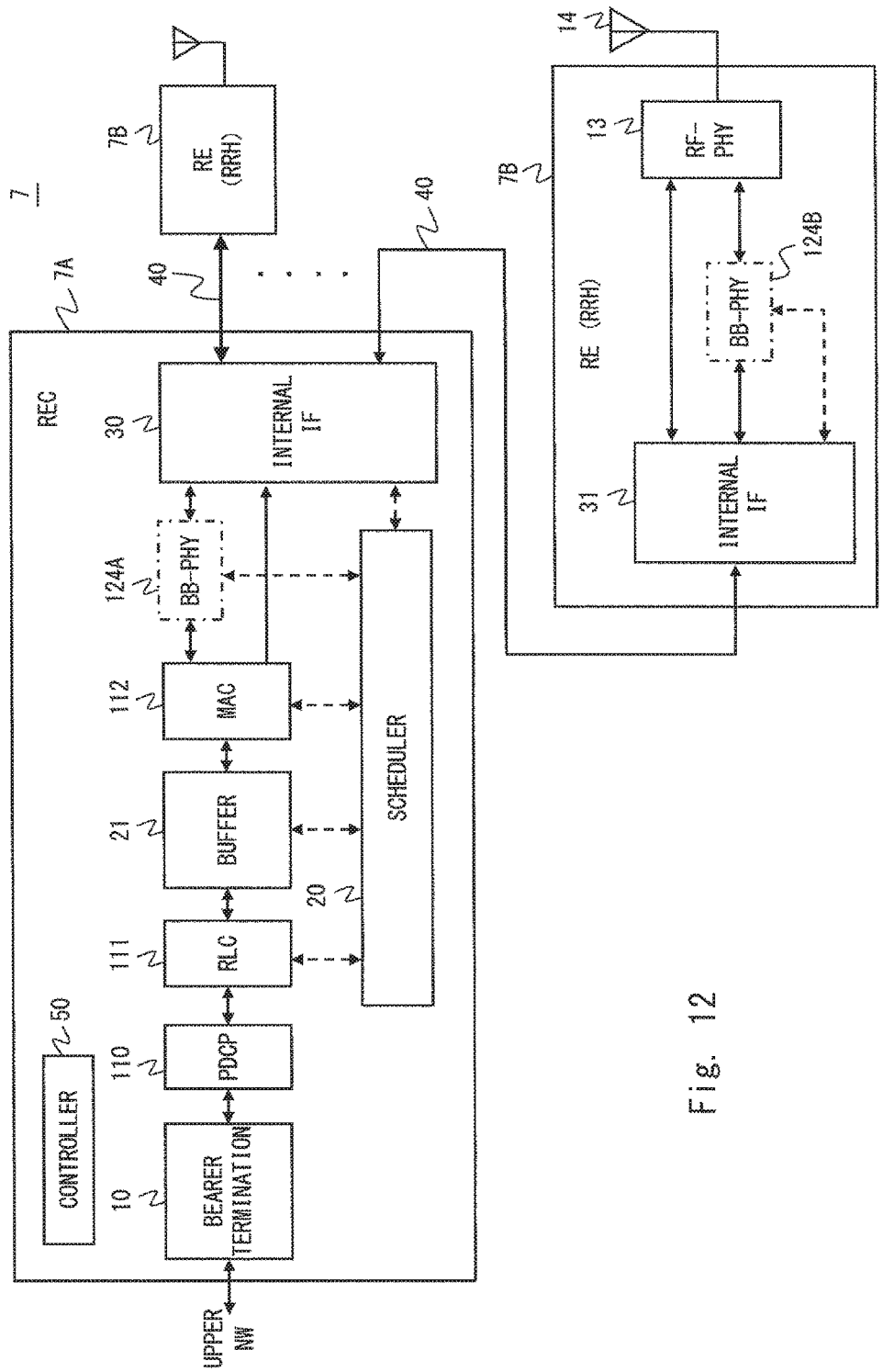
FIG. 12 is a block diagram showing a configuration example of a radio base station according to a seventh embodiment of the invention.

FIG. 12 is a block diagram showing a configuration example of a radio base station 7 according to this embodiment. The radio base station 7 includes a first part, i.e., a radio equipment controller (REC) 7A, and a second part, i.e., a radio equipment (RE) 7B. In the configuration example of FIG. 12, the REC 7A and the RE 7B include BB-PHY units 124A and 124B, respectively. The REC 7A further includes a unit that performs layer-2 signal processing. More specifically, since FIG. 12 shows a specific example of the E-UTRA, the REC 7A includes the PDCP unit 110, the RLC unit 111, and the MAC unit 112.

The BB-PHY units 124A and 124B perform digital baseband signal processing for the physical layer. More specifically, the signal processing performed by the BB-PHY units 124A and 124B includes channel coding and modulation for transmitting the downlink user data to the air interface. The signal processing performed by the BB-PHY unit 12 also includes demodulation and channel decoding for restoring the uplink user data from the signal received from the air interface. The channel coding and decoding includes, for example, block coding or convolutional coding, or a combination thereof. The channel coding and decoding by the BB-PHY units 124A and 124B are performed by using, for example, a coding algorithm such as turbo code, Viterbi code, or Reed-Solomon code. Depending on the communication system, the signal processing performed by the BB-PHY units 124A and 124B may include, for example, spreading/de-spreading, resource mapping, and generation of an OFDM signal involving Inverse Fast Fourier Transform (IFFT).

The radio base station 7 according to this embodiment is configured to select one of the BB-PHY units 124A and 124B to be used. Accordingly, the radio base station 7 can select which one of the REC 7A and the RE 7B is used to perform the digital baseband signal processing for the physical layer, depending on the need to be preferentially met among the plurality of needs, such as the need for reducing the amount of traffic between the REC and the RE, and the need for achieving the cooperative control among the plurality of REs.

When the BB-PHY unit 124B of the RE 7B is used, the data stream that contains the user data and is transmitted through the transmission line 40 does not include redundant data generated as a result of channel coding (e.g., block coding, convolutional coding, or turbo coding). Accordingly, the radio base station 7 can suppress the data amount to be transmitted between the REC 7A and the RE 7B. Further, even when the BB-PHY unit 124B of the RE 7B is used, the digital signal processing can be performed in a distributed manner between the REC 7A and the RE 7B, because the layer-2 signal processing function is placed in the REC 7A. Furthermore, according to this embodiment, layer-2 unit (i.e., the PDCP unit 110, the RLC unit 111, and the MAC unit 112) which is arranged in the REC 7A can be shared for processing the user data pertaining to the plurality of REs 7B. Therefore, these layer-2 units can be effectively used.

On the other hand, when the BB-PHY unit 124A of the REC 7A is used, the radio base station 7 can relatively easily perform the cooperative transmission and reception (e.g., CoMP). This is because it is only necessary for the scheduler 20 to control the RLC unit 111, the MAC unit 112, and the BB-PHY unit 124A, which are arranged in the REC 7A, upon execution of dynamic scheduling.

Figure 13A:
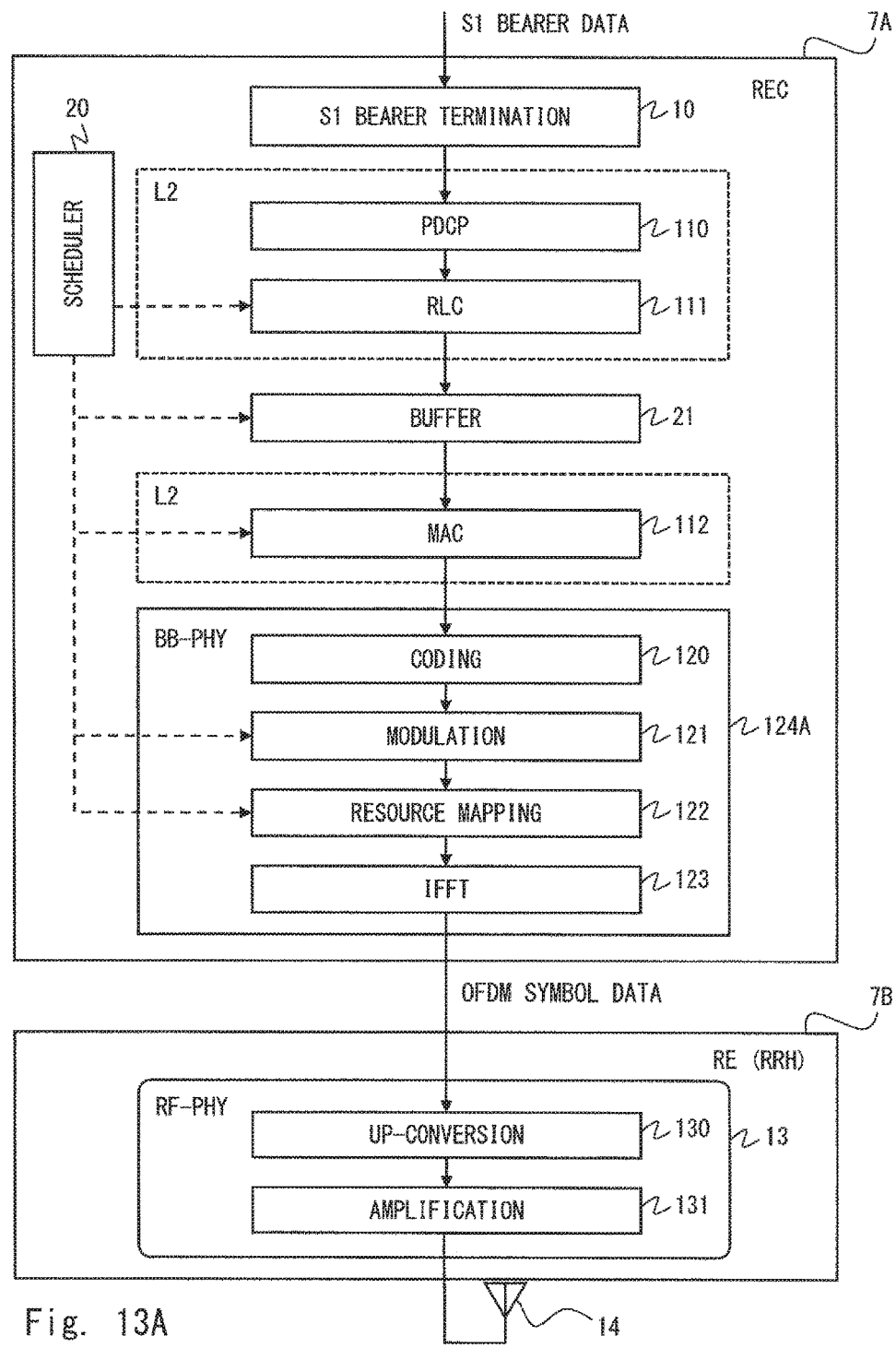
FIG. 13A is a diagram showing a protocol structure and a functional layout of the radio base station according to the seventh embodiment of the invention.
Figure 13B:
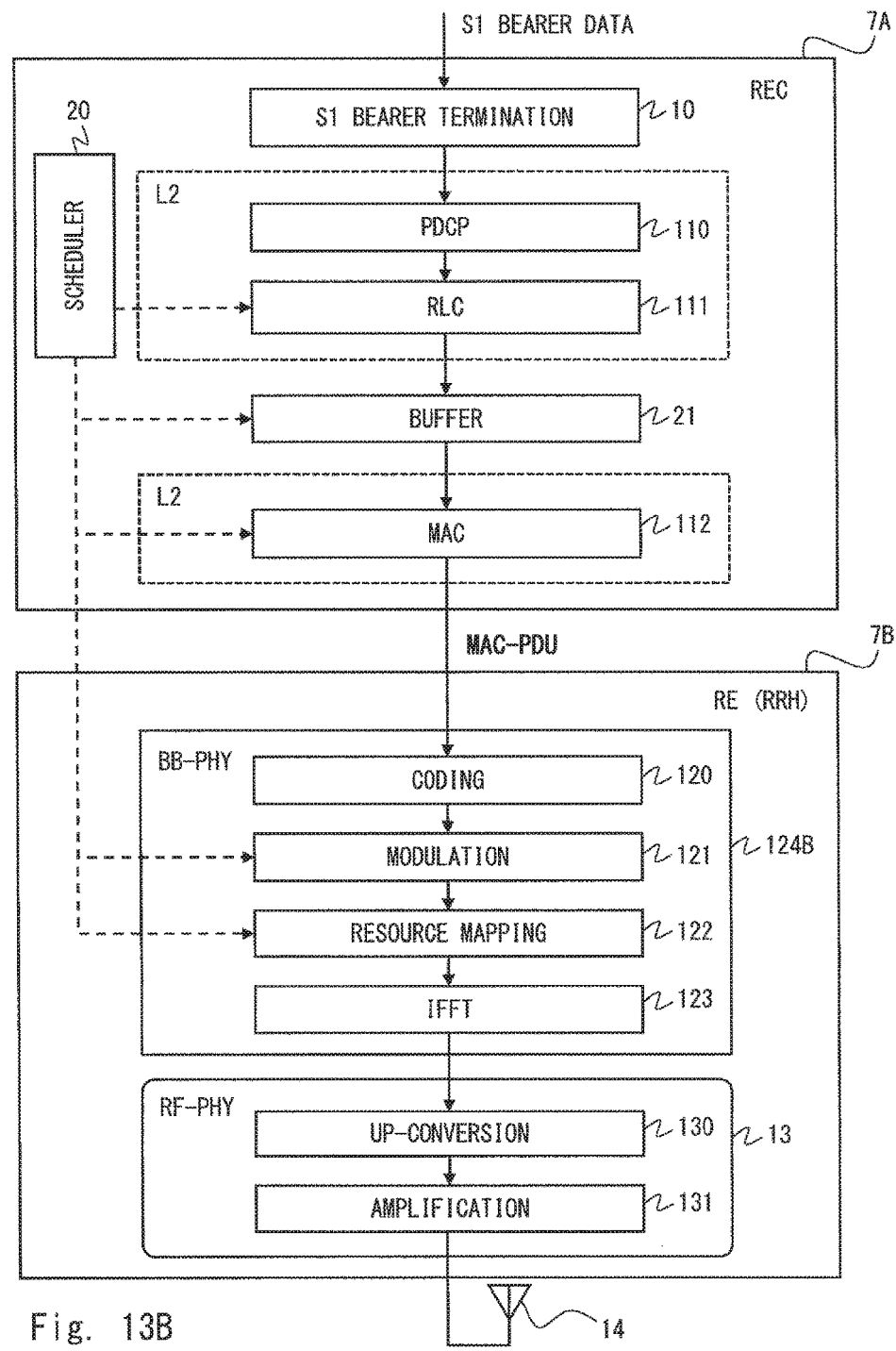
FIG. 13B is a diagram showing a protocol structure and a functional layout of the radio base station according to the seventh embodiment of the invention.

FIGS. 13A and 13B show the details of the functional layout in the radio base station 7 regarding the downlink transmission of user data in the E-UTRA. The functional layout shown in FIG. 13A corresponds to the case where the BB-PHY unit 124A of the REC 7A is used in the configuration example of FIG. 12. On the other hand, the functional layout shown in FIG. 13B corresponds to the case where the BB-PHY unit 124B of the RE 7B is used. In the example of FIG. 13A, the OFDM symbol data (baseband OFDM signal) is transferred from the REC 7A to the RE 7B. In the example of FIG. 13B, the MAC-PDU (i.e., a transport channel) is transferred from the REC 7A to the RE 7B.

In the example shown in FIGS. 12, 13A, and 13B, the buffer 21 is arranged between the RLC unit 111 and the MAC unit 112. Accordingly, the buffer 21 may store the RLC PDUs (i.e., a logical channel) for each mobile station, for each bearer, for each QoS class, or for each mobile station and each QoS class. However, as described in detail in the first embodiment, the layout of the buffer 21 can be changed as needed. For example, the buffer 21 may be arranged between the PDCP unit 110 and the RLC unit 111.

Eighth Embodiment

This embodiment illustrates an example in which the layer-2 signal processing to be performed on user data is allocated to both the REC and the RE, and the physical layer signal processing to be performed on user data is allocated only to the RE.

Figure 14:
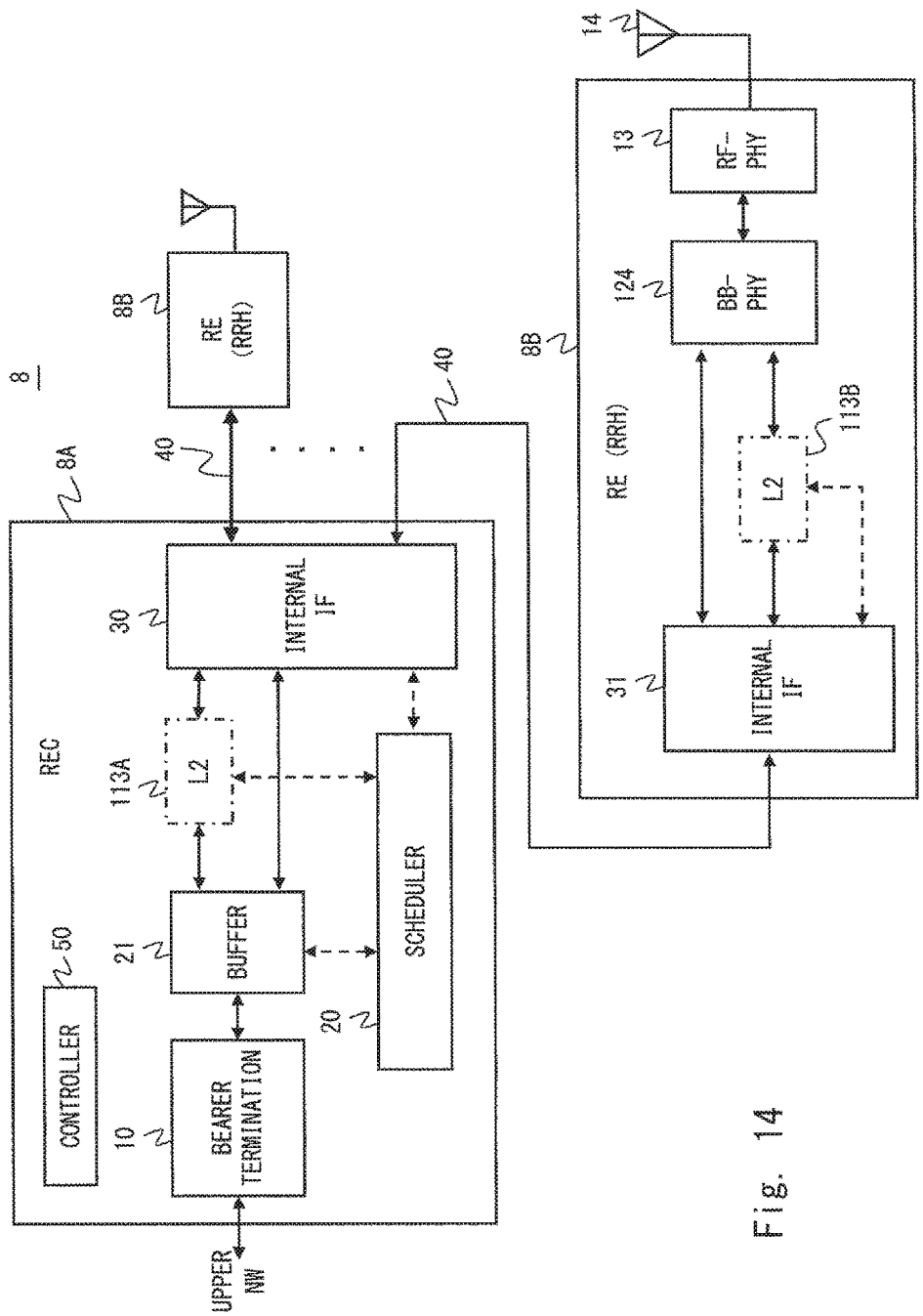
FIG. 14 is a block diagram showing a configuration example of a radio base station according to an eighth embodiment of the invention.

FIG. 14 is a block diagram showing a configuration example of a radio base station 8 according to this embodiment. The radio base station 8 includes a first part, i.e., a radio equipment controller (REC) 8A, and a second part, i.e., a radio equipment (RE) 8B. In the configuration example of FIG. 14, the REC 8A and the RE 8B include layer-2 units 113A and 113B, respectively. The RE 8B further includes a BB-PHY unit 124.

The layer-2 units 113A and 113B perform the layer-2 signal processing except for dynamic scheduling. The layer-2 signal processing includes at least one of (i) data compression/de-compression, (ii) data encryption, (iii) addition/removal of a layer-2 header, data segmentation/concatenation, and (v) composition/decomposition of a transfer format by data multiplexing/de-multiplexing. In the case of E-UTRA, as a specific example, the layer-2 signal processing includes processing of the RLC sublayer and the MAC sublayer. The E-UTRA further includes a PDCP sublayer as an upper sublayer of the RLC sublayer. However, processing (e.g., IP header compression, encryption) in the PDCP sublayer is not essential and may be omitted.

The BB-PHY unit 124 is selectively coupled to the layer-2 unit 113A or 113B. Specifically, the BB-PHY unit 124 receives, from the layer-2 unit 113A or 113B, a data stream (e.g., MAC PDUs, a transport channel) obtained after the layer-2 processing, and generates modulation symbol data (or OFDM symbol data). Further, the BB-PHY unit 124 receives the baseband reception signal stream from the RF-PHY unit 13, generates an uplink data stream (e.g., MAC PDUs, a transport channel), and supplies this to the layer-2 unit 113A or 113B.

The radio base station 8 according to this embodiment is configured to select one of the layer-2 units 113A and 113B to be used. Accordingly, the radio base station 8 can select which one of the REC 8A and the RE 8B is used to perform the layer-2 signal processing, depending on the need to be preferentially met among the plurality of needs, such as the need for reducing the processing load of the REC 8A, and the need for achieving the cooperative control among the plurality of REs 8B.

When the layer-2 unit 113A of the REC 8A is used, the radio base station 8 can relatively easily perform the cooperative transmission and reception (e.g., CoMP). This is because the scheduler 20 only needs to control the layer-2 unit 113A, which is arranged in the REC 8A, upon execution of dynamic scheduling. Further, even when the layer-2 unit 113A of the REC 8A is used, the data stream that contains the user data and is transmitted through the transmission line 40 does not include redundant data generated as a result of channel coding (e.g., block coding, convolutional coding, or turbo coding). This is because the BB-PHY unit 124 that performs channel coding/decoding is arranged in the RE 8B. Accordingly, the radio base station 8 can suppress the data amount to be transmitted between the REC 8A and the RE 8B, regardless of which one of the layer-2 units 113A and 113B is used.

Figure 15A:
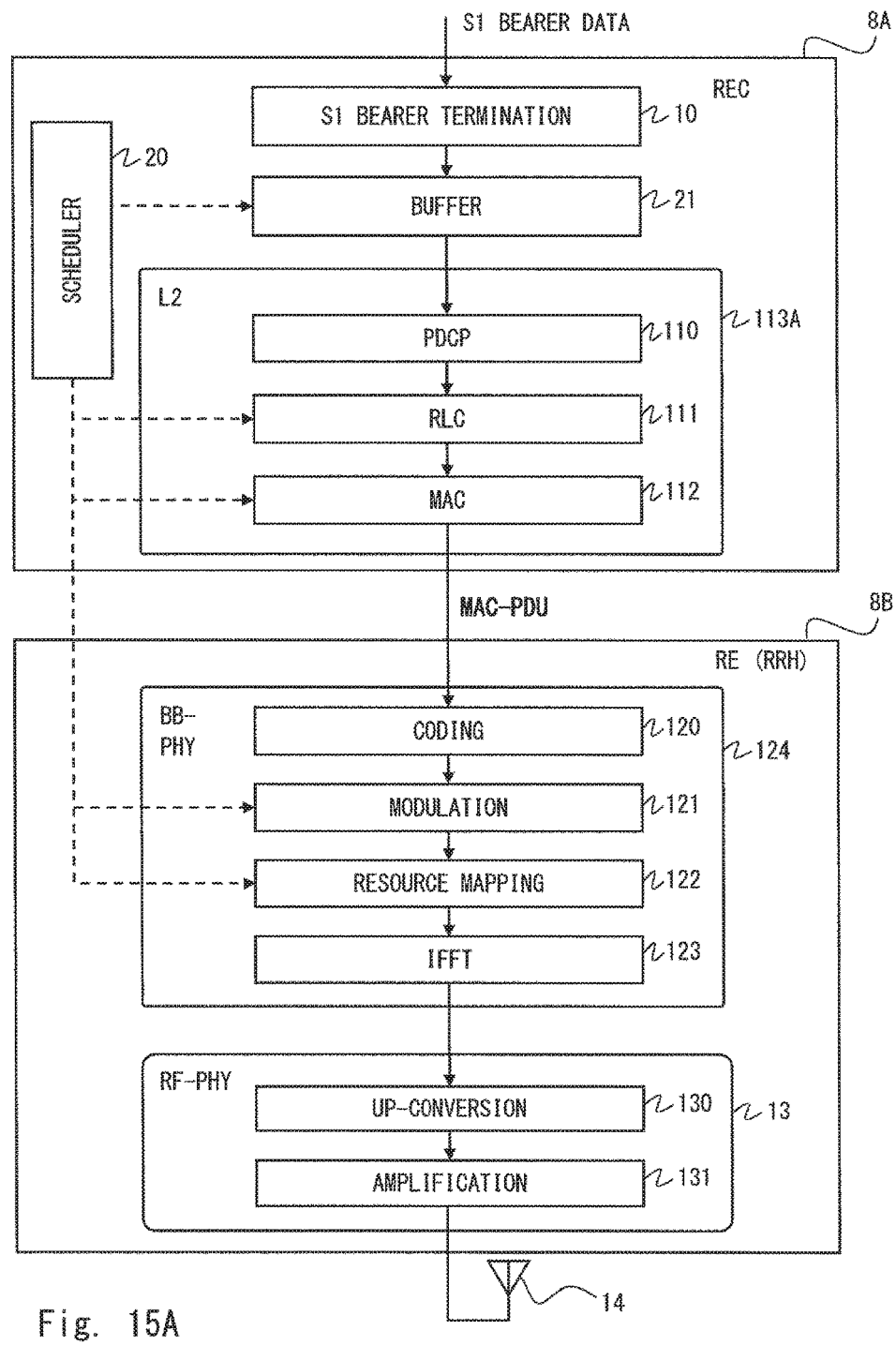
FIG. 15A is a diagram showing a protocol structure and a functional layout of the radio base station according to the eighth embodiment of the invention.
Figure 15B:
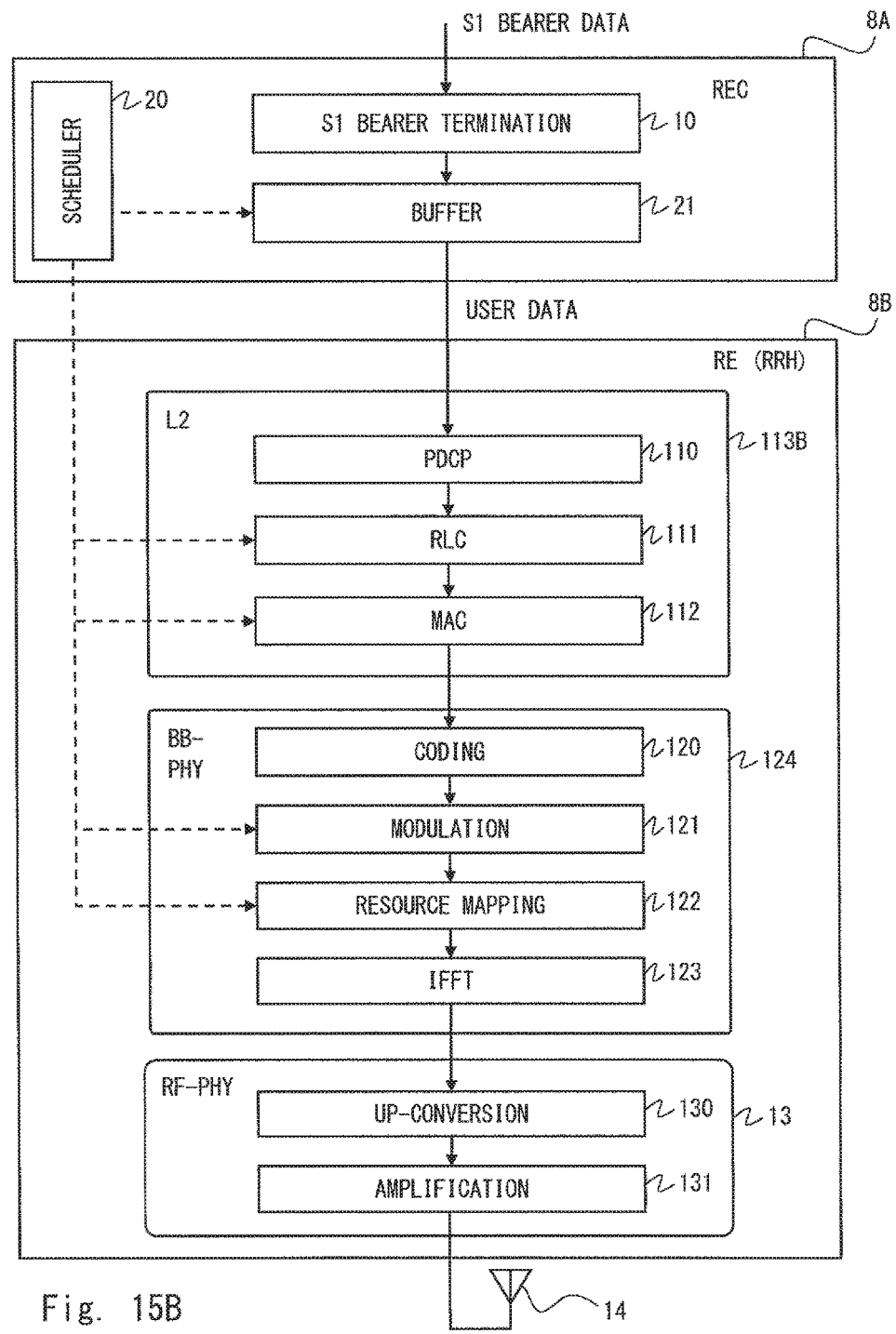
FIG. 15B is a diagram showing a protocol structure and a functional layout of the radio base station according to the eighth embodiment of the invention.

FIGS. 15A and 15B show the details of the functional layout in the radio base station 8 regarding the downlink transmission of user data in the E-UTRA. The functional layout shown in FIG. 15A corresponds to the case where the layer-2 unit 113A of the REC 8A is used in the configuration example of FIG. 14. On the other hand, the functional layout shown in FIG. 15B corresponds to the case where the layer-2 unit 113B of the RE 8B is used. In the example of FIG. 15A, MAC-PDUs (i.e., a transport channel) are transferred from the REC 8A to the RE 8B. In the example of FIG. 15B, the user data before performing the layer-2 processing is transferred from the REC 8A to the RE 8B.

Other Embodiments

The radio base stations 1 to 8 respectively described in the first to eighth embodiments may be relay stations. The relay station establishes a first radio link (a backhaul link) with a base station and establishes a second radio link (an access link) with a mobile station, thereby relaying data between the base station and the mobile station.

The bearer termination units, the layer-2 units, the BB-PHY units, and the schedulers, which are described in the first to eighth embodiments, may be implemented by using a semiconductor processing device including, for example, an ASIC (Application Specific Integrated Circuit) and a DSP (Digital Signal Processor). These units may be implemented by causing a computer, such as a microprocessor, to execute a program.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

The first to eighth embodiments can be combined as appropriate. Furthermore, the present invention is not limited to the embodiments described above, and can be modified in various manners without departing from the gist of the invention described above.

This application is based upon and claims the benefit of priority from Japanese patent application No. 2011-257477, filed on Nov. 25, 2011, the disclosure of which is incorporated herein in its entirety by reference.

REFERENCE SIGNS LIST

1-8 RADIO BASE STATIONS
1A-7A RADIO EQUIPMENT CONTROLLERS (REC)
1B-7B RADIO EQUIPMENT (RE)
10, 10A, 10B BEARER TERMINATION UNITS
11A, 11B BB UNITS
13 RF-PHY UNIT
14 ANTENNA
20 SCHEDULER
20A PRIMARY SCHEDULER
20B SECONDARY SCHEDULER
20C FIRST SCHEDULER
20D SECOND SCHEDULER
21, 21A, 21B BUFFERS
30, 31 INTERNAL INTERFACES
40 TRANSMISSION LINE
50 CONTROLLER
51 HANDOVER CONTROL UNIT
110 PDCP UNIT
111 RLC UNIT
112 MAC UNIT
113A, 113B LAYER-2 UNITS
120 CODING UNIT
121 MODULATION UNIT
122 RESOURCE MAPPING UNIT
123 IFFT UNIT
124, 124A, 124B BB-PHY UNITS
130 UP-CONVERTER
131 AMPLIFIER

The invention claimed is:

1. A radio station comprising:
a central unit, implemented by causing at least one first hardware processor to execute at least one first program stored in at least one first memory; and
at least one distributed unit, implemented by causing at least one second hardware processor to execute at least one second program stored in at least one second memory, that can be arranged so as to be physically separated from the central unit and is connected to the central unit via a transmission line so as to be able to communicate with the central unit, wherein
the central unit comprises:
a Packet Data Convergence Protocol (PDCP) layer unit, implemented by causing the at least one first hardware processor to execute the at least one first program stored in the at least one first memory, configured to perform processing of a PDCP layer; and
a first Radio Link Control (RLC) layer unit, implemented by causing the at least one first hardware processor to execute the at least one first program stored in the at least one first memory, configured to perform processing of a RLC layer,
the distributed unit comprises:
a Physical (PHY) layer unit, implemented by causing the at least one second hardware processor to execute the at least one second program stored in the at least one second memory, configured to perform processing of a PHY layer;
a Media Access Control (MAC) layer unit, implemented by causing the at least one second hardware processor to execute the at least one second program stored in the at least one second memory, configured to perform processing of a MAC layer; and
a second RLC layer unit, implemented by causing the at least one second hardware processor to execute the at least one second program stored in the at least one second memory, configured to perform processing of the RLC layer,
wherein the second RLC layer unit is configured to at least perform segmentation and concatenation of the RLC layer, and the first RLC layer unit is configured to control an Automatic Repeat reQuest (ARQ) of the RLC layer when the second RLC layer unit does not control the ARQ of the RLC layer, and
wherein one of the first and second RLC layer units to be used for controlling the ARQ of the RLC layer is selected based on a security level of user data of a mobile station to be connected to the distributed unit.

2. The radio station according to claim 1, wherein the PDCP layer unit configured to perform Internet Protocol (IP) header compression and encryption.

3. The radio station according to claim 1, wherein the PHY layer unit configured to perform channel coding/decoding, modulation/demodulation, resource mapping and generation of OFDM symbol data by Inverse Fast Fourier Transform (IFFT).

4. The radio station according to claim 3, wherein the MAC Layer unit configured to perform multiplexing of the logical channels and control Hybrid-ARQ of the MAC layer.

5. A method of operating a radio station, the radio station including a central unit and at least one distributed unit that can be arranged so as to be physically separated from the central unit and is connected to the central unit via a transmission line so as to be able to communicate with the central unit, the method comprising:

performing processing of a Packet Data Convergence Protocol (PDCP) layer by a PDCP layer unit included in the central unit;

performing processing of a Radio Link Control (RLC) layer by a first RLC layer unit included in the central unit;

performing processing of a Physical (PHY) layer by a PHY layer unit included in the distributed unit;

performing processing of a Media Access Control (MAC) layer by a MAC layer unit included in the distributed unit; and performing processing of the RLC layer by a second RLC layer unit included in the distributed unit, performing, by the second RLC layer unit, segmentation and concatenation of the RLC layer, controlling, by the first RLC layer unit, an Automatic Repeat reQuest (ARQ) of the RLC layer when the second RLC layer unit does not control the ARQ of the RLC layer, and selecting one of the first and second RLC layer units to be used for controlling the ARQ of the RLC layer, based on a security level of user data of a mobile station to be connected to the distributed unit.

* * * * *

UNITED STATES PATENT AND TRADEMARK OFFICE
CERTIFICATE OF CORRECTION

PATENT NO. : 10,091,806 B2  
APPLICATION NO. : 15/331404  
DATED : October 2, 2018  
INVENTOR(S) : Hiroaki Aminaka et al.

Page 1 of 1

It is certified that error appears in the above-identified patent and that said Letters Patent is hereby corrected as shown below:

(72) Inventors should read: Hiroaki Aminaka, Tokyo (JP);
Kojiro Hamabe, Tokyo (JP)

Signed and Sealed this
Twentieth Day of November, 2018

Andrei Iancu
*Director of the United States Patent and Trademark Office*